United States Patent
Katayama

(10) Patent No.: US 9,063,483 B2
(45) Date of Patent: Jun. 23, 2015

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Junichi Katayama, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 14/173,975

(22) Filed: Feb. 6, 2014

(65) Prior Publication Data

US 2014/0255055 A1    Sep. 11, 2014

(30) Foreign Application Priority Data

Mar. 8, 2013 (JP) .................... 2013-46574

(51) Int. Cl.
*G03G 15/20* (2006.01)
(52) U.S. Cl.
CPC ................. *G03G 15/2039* (2013.01)
(58) Field of Classification Search
CPC   G03G 15/0178; G03G 15/5045; G03G 21/00
USPC ............................. 399/46, 54, 66
See application file for complete search history.

(56) References Cited

U.S. PATENT DOCUMENTS

| 5,394,231 A * | 2/1995 | Sudo et al. ......... 399/228 |
| 2012/0321350 A1* | 12/2012 | Ogasawara ......... 399/223 |

FOREIGN PATENT DOCUMENTS

| JP | 06-324600 | 11/1994 |
| JP | 10-39670 | 2/1998 |
| JP | 2005-043860 | 2/2005 |
| JP | 2007-328367 | 12/2007 |

OTHER PUBLICATIONS

Office Action of Notice of Reasons for Rejection for Japanese Patent Application No. 2013-046574 Dated Sep. 2, 2014, 8 pgs.

* cited by examiner

*Primary Examiner* — Gregory H Curran
(74) *Attorney, Agent, or Firm* — Amin, Turocy & Watson, LLP

(57) ABSTRACT

According to an embodiment, an image forming apparatus has a fixing unit which heats an image formed on a recording medium at a fixing temperature, to fix the image on the recording medium. When a heating temperature of the fixing unit becomes a temperature higher than the fixing temperature, the image forming apparatus switches image forming, from image forming by a first mode using a discolorable coloring material, to image forming by a second mode using a non-discolorable coloring material.

9 Claims, 12 Drawing Sheets

| CLSSIFICATION OF TEMPERATURE | HEATING TEMPERATURE OF FIXING UNIT [°C] |
|---|---|
| FIXABLE TEMPERATURE (LOWER LIMIT TEMPERATURE) OF DISCOLORABLE TONER | 150 |
| FIXABLE TEMPERATURE (LOWER LIMIT TEMPERATURE) OF NON-DISCOLORABLE TONER | 170 |
| ERASING TEMPERATURE OF DISCOLORABLE TONER | 190 |

Fig.3

IMAGE FORMING APPARATUS

CROSS-REFERENCE TO RELATED APPLICATION

This application is based upon and claims the benefit of priority from the prior Japanese Patent Application No. 2013-46574, filed on Mar. 8, 2013, the entire contents of which are incorporated herein by reference.

FIELD

Embodiments described herein relate generally to an image forming apparatus.

BACKGROUND

An image forming apparatus which forms an image with erasable coloring material has already been put into practical use. As the erasable coloring material, coloring material which is made transparent by heating is known. For example, an image forming apparatus can form an erasable full color image with erasable coloring materials of BK (black), C (cyan), M (magenta), Y (yellow).

The image forming apparatus forms an image of toner on a photoconductor drum with erasable coloring material, such as erasable toner. The image forming apparatus primarily transfers the toner image from the photoconductor drum to a transfer belt. The image forming apparatus secondarily transfers the toner image from the transfer belt to a recording medium, such as a sheet. The image forming apparatus fixes the toner image transferred to the sheet by heating by a fixing unit. The fixing unit is temperature controlled so that a heating temperature becomes a fixing temperature within the range from 150 degrees to 180 degrees.

As described above, the heating temperature of the fixing unit is controlled to the fixing temperature within the range of 150 degrees to 180 degrees, but the heating temperature of the fixing unit may exceed an upper limit temperature of the fixing temperature. For example, being heated by the fixing unit at not less than 190 degrees, the erasable coloring material is made transparent.

BRIEF DESCRIPTION OF THE DRAWINGS

FIG. 3 is a diagram showing an example of a heating temperature of the fixing device of the image forming apparatus according to the first and second embodiments.

DETAILED DESCRIPTION

Figure 1:
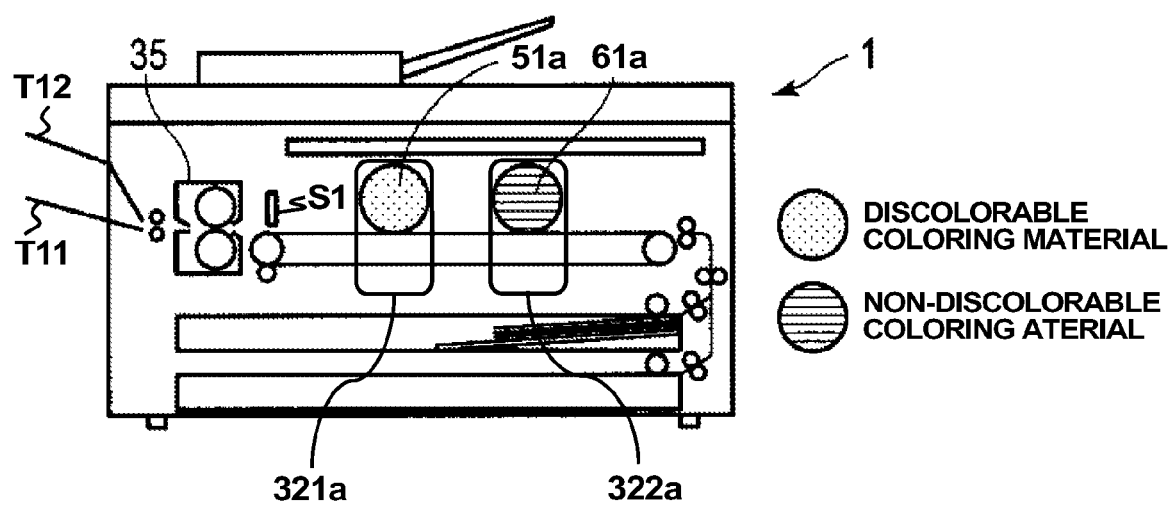
FIG. 1 is a view showing an example of a schematic configuration of an image forming apparatus according to a first embodiment.

According to an embodiment, an image forming apparatus has an image forming unit, a fixing unit, a temperature control unit, and an operation control unit. The image forming unit executes any image forming out of image forming to form an image on a recording medium by a first mode using a discolorable coloring material which discolors by heating, and image forming to form an image on a recording medium by a second mode using a non-discolorable coloring material. The fixing unit heats the image formed on the recording medium at a fixing temperature lower than a heating temperature at which the discolorable coloring material discolors, to fix the image on the recording medium. The temperature control unit controls a heating temperature of the fixing unit to the fixing temperature. The operation control unit selects the image forming by the second mode, when the heating temperature of the fixing unit becomes a temperature higher than the fixing temperature.

Hereinafter, further embodiments will be described with reference to the drawings. In the drawings, the same symbols represent the same or similar portions.

Embodiments will be described with reference to FIG. 1, FIG. 2, FIG. 7 to FIG. 9. Image forming apparatuses 1 according to the embodiments shown in FIG. 1, FIG. 2, FIG. 7 to FIG. 9 are MFPs (multi-function peripherals). Hereinafter, each of the image forming apparatuses 1 according to the embodiments is simply referred to as the MFP 1.

Figure 2:
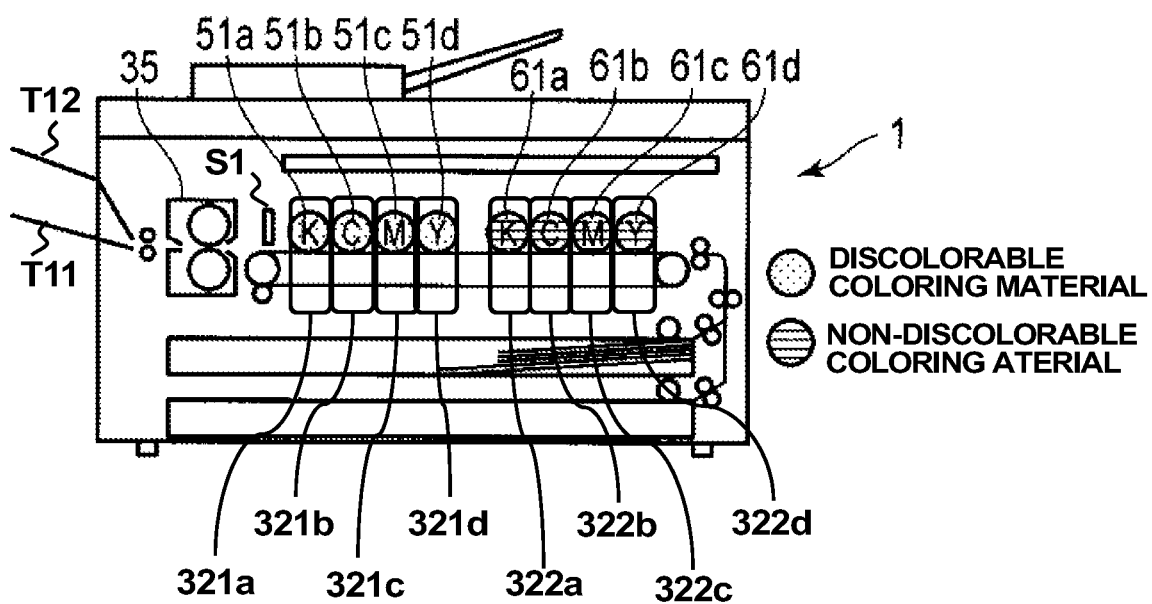
FIG. 2 is a view showing an example of a schematic configuration of an image forming apparatus according to a second embodiment.

FIG. 1 is a view showing a main portion of the MFP 1 of a first embodiment for easily comprehending monochrome image forming using a monochrome discolorable coloring material and monochrome image forming using a monochrome non-discolorable coloring material in the MFP 1. FIG. 2 is a view showing a main portion of the MFP 1 of a second embodiment for easily comprehending color image forming using discolorable coloring materials of a plurality of colors, and color image forming using non-discolorable coloring materials of a plurality of colors.

Figure 7:
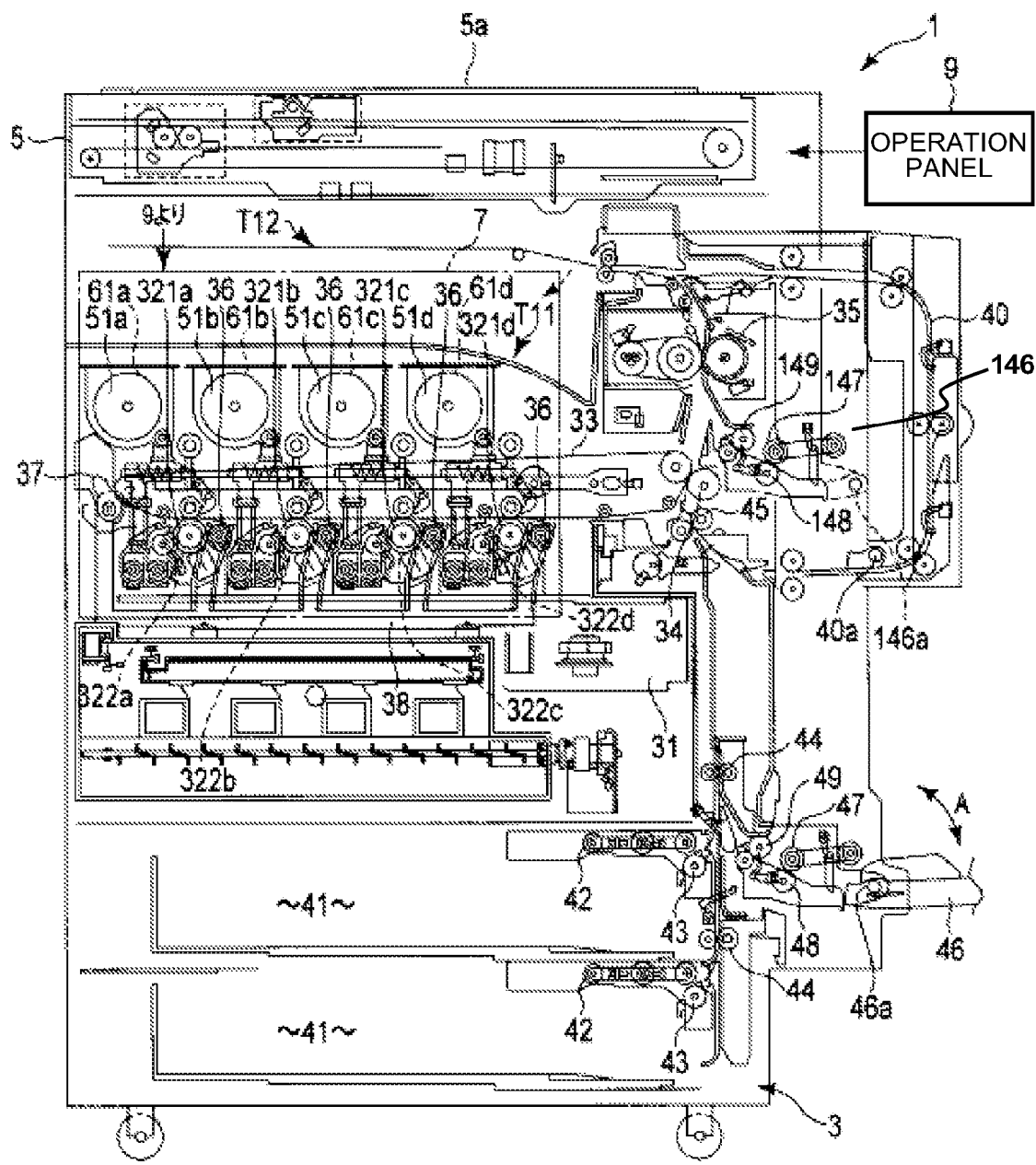
FIG. 7 is a view showing an example of a specific configuration of the image forming apparatus according to the first and second embodiments.
Figure 8:
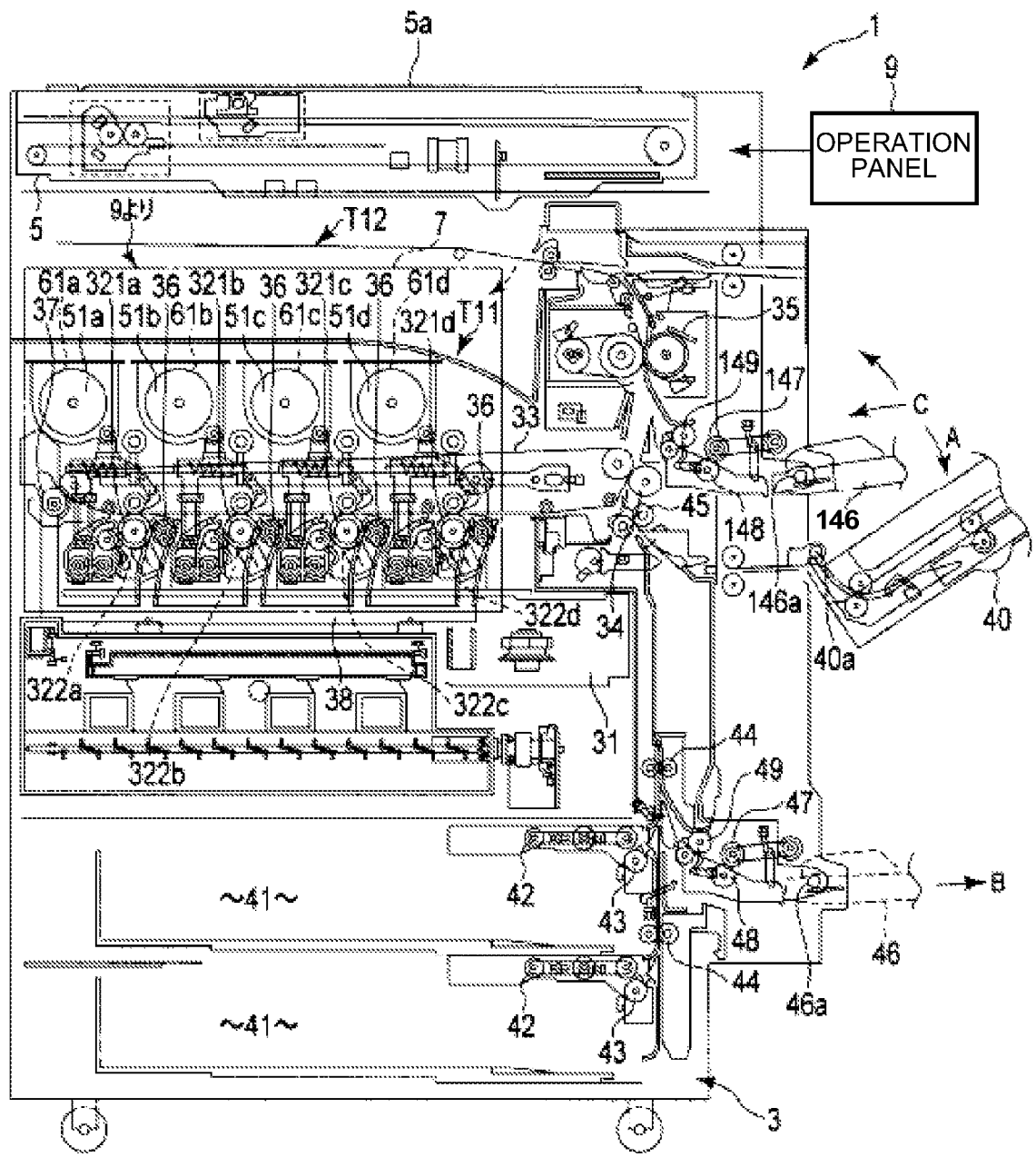
FIG. 8 is a view showing an example of a specific configuration of the image forming apparatus, when a manual feed tray for erasing operation is loaded on the image forming apparatus according to the first and second embodiments.
Figure 9:
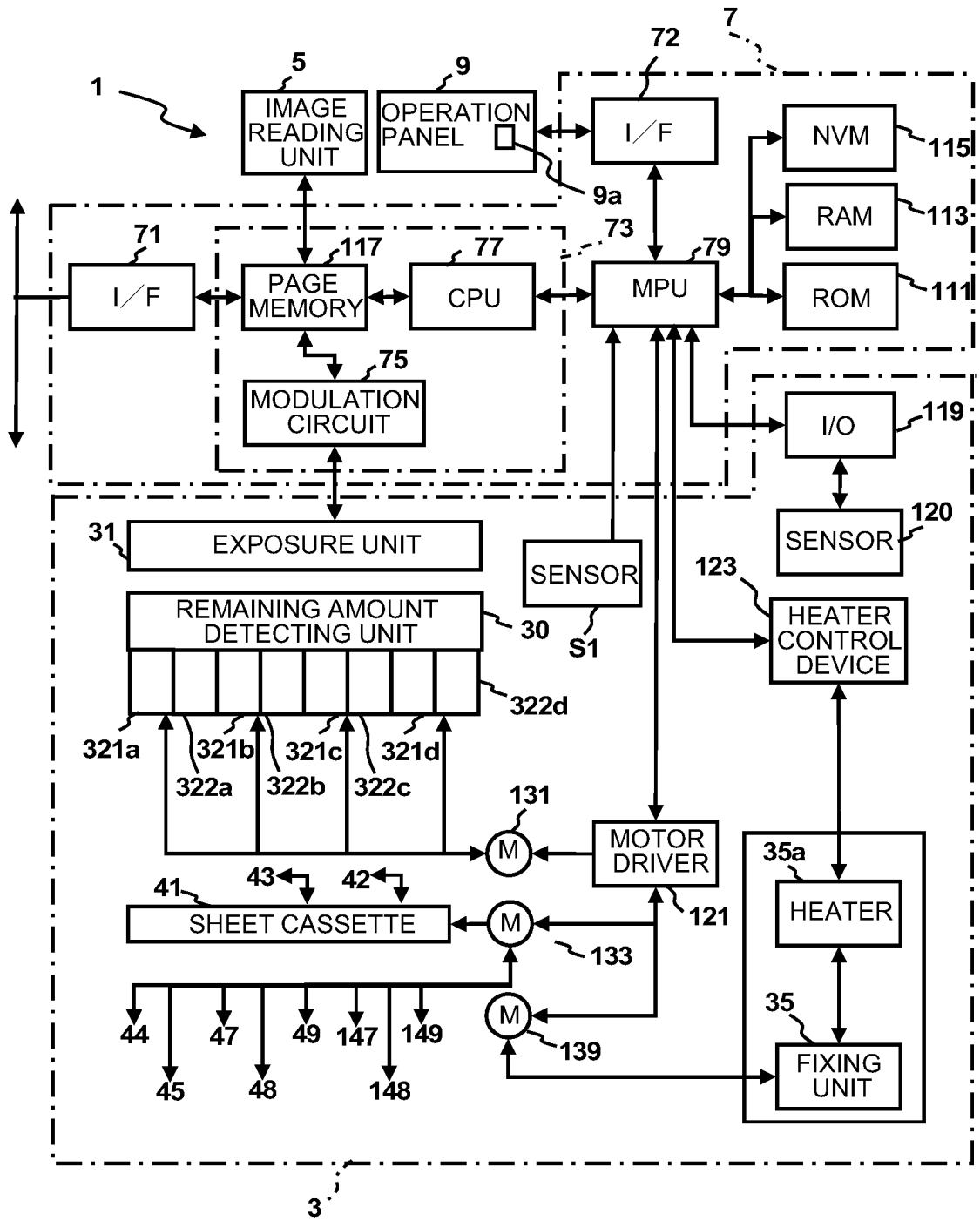
FIG. 9 is a diagram showing an example of a functional block of the image forming apparatus according to the first and second embodiments.

FIG. 7 to FIG. 9 are views each showing an example of the MFP 1 for realizing color image forming by means of toners that are discolorable coloring materials of a plurality of colors, and color image forming by means of toners that are non-discolorable coloring materials of a plurality of colors.

The MFPs 1 shown in FIG. 1 and FIG. 2 are a little different in the appearance and internal configuration thereof from the MFPs 1 shown in FIG. 7, FIG. 8, but may be the same.

The MFP 1 shown in FIG. 1 has a plurality of housing units to house coloring materials 51a, 61a, respectively. The housing units to house the respective coloring materials 51a, 61a are arranged along a sheet conveying direction (in FIG. 1, in the left and right direction). The MFP 1 shown in FIG. 1 has image forming stations 321a, 322a. The image forming stations 321a, 322a are arranged at positions facing the housing units to house coloring material 51a, 61a, respectively. The coloring material 51a is a discolorable BK (black) toner. The coloring material 61a is a non-discolorable BK toner.

The MFP 1 shown in FIG. 2 has a plurality of housing units to house coloring materials 51a, 51b, 51c, 51d, 61a, 61b, 61c, 61d respectively. The housing units to house the respective coloring materials 51a-51d, 61a-61d are arranged along a sheet conveying direction (in FIG. 2, in the left and right direction). The MFP 1 shown in FIG. 2 has a first to an eighth image forming stations 321a, 321b, 321c, 321d, 322a, 322b, 322c, 322d. The first to eighth image forming stations 321a-321d, 322a-322d are arranged at positions facing the housing units to house coloring material 51a-51d, 61a-61d, respectively. The coloring materials 51a-51d are discolorable BK (black), C (cyan), M (magenta), Y (yellow) toners, respectively. The coloring materials 61a-61d are non-discolorable BK, C, M, K toners, respectively.

The above-described housing units to house the toners 51a-51d and the toners 61a-61d supply the toners 51a-51d and the toners 61a-61d to developing units of the image forming stations 321a-321d, 322a-322d, respectively. The MFP 1 has a configuration to replenish a toner when the remaining amount of the toner housed in each housing unit runs short. For example, each of the housing units is detachably provided in the main body of the MFP 1 so that the housing unit can be exchanged to a new housing unit. Accordingly, the MFP 1 has a configuration which, when the remaining amount of a toner runs short, the housing unit to house the toner whose remaining amount runs short is exchanged to a new housing unit by a user, and thus can replenish the toner. The shortage of the toner remaining amount is detected by a remaining amount detecting unit 30 described later. Each of the MFPs 1 (hereinafter, simply stated as the MFP 1, for simplicity) shown in FIG. 1 and FIG. 2 has a first sheet discharge tray T11 and a second sheet discharge tray T12. The first sheet discharge tray T11 and the second sheet discharge tray T12 are provided to protrude from the side face of the main body of the MFP 1.

On the other hand, the MFP 1 shown in FIG. 7 and FIG. 8 has housing units to house the above-described respective coloring materials 51a-51d, 61a-61d. The housing units to house the respective coloring materials 51a-51d are arranged along a moving direction of an intermediate transfer belt 33 described later (in FIG. 7 and FIG. 8, in the left and right direction). The housing units to house the coloring materials 61a-61d are arranged at the back sides (in the drawings, at the rear face side) of the housing units to house the coloring materials 51a-51d, respectively. Accordingly, the housing units to house the coloring materials 61a-61d are in the state hidden by the coloring materials 51a-51d, respectively. The MFP 1 shown in FIG. 7 and FIG. 8 has the above-described first to eighth image forming stations 321a-321d, 322a-322d. The first to fourth image forming stations 321a-321d are arranged at positions facing the housing units to house the coloring material 51a-51d, respectively. The fifth to eighth image forming stations 322a-322d are arranged at positions facing the housing units to house the coloring material 61a-61d, respectively. Accordingly, the fifth to eighth image forming stations 322a-322d are in the state hidden by the first to fourth image forming stations 321a-321d, respectively. The MFP 1 shown in FIG. 7 and FIG. 8 has the above-described first sheet discharge tray T11 and second sheet discharge tray T12. The first sheet discharge tray T11 and the second sheet discharge tray T12 are provided at the positions enclosed by the main body of the MFP 1, in FIG. 7 and FIG. 8.

For example, the MFP 1 shown in FIG. 7 and FIG. 8 has a moving mechanism to move the first to eighth image forming stations 321a-321d, 322a-322d to the facing positions of the intermediate transfer belt 33, and the positions displaced from the facing positions. The moving mechanism moves the first image forming station (or the fifth image forming station) to be used, out of the first image forming station 321a and the fifth image forming station 322a, to the facing position of the intermediate transfer belt 33. The moving mechanism moves the fifth image forming station (or the first image forming station) not to be used, out of the first image forming station 321a and the fifth image forming station 322a, to the position displaced from the facing position of the intermediate transfer belt 33. The fifth image forming station (or the first image forming station) not to be used becomes in a standby state at the position displaced from the facing position.

Similarly as described above, the moving mechanism moves the second image forming station (or the sixth image forming station) to be used, out of the second image forming station 321b and the sixth image forming station 322b, to the facing position of the intermediate transfer belt 33. The moving mechanism moves the sixth image forming station (or the second image forming station) not to be used, out of the second image forming station 321b and the sixth image forming station 322b, to the position displaced from the facing position of the intermediate transfer belt 33. The sixth image forming station (or the second image forming station) not to be used becomes in a standby state at the position displaced from the facing position.

Similarly as described above, the moving mechanism moves the third image forming station (or the seventh image forming station) to be used, out of the third image forming station 321c and the seventh image forming station 322c, to the facing position of the intermediate transfer belt 33. The moving mechanism moves the seventh image forming station (or the third image forming station) not to be used, out of the third image forming station 321c and the seventh image forming station 322c, to the position displaced from the facing position of the intermediate transfer belt 33. The seventh image forming station (or the third image forming station) not to be used becomes in a standby state at the position displaced from the facing position.

Similarly as described above, the moving mechanism moves the fourth image forming station (or the eighth image forming station) to be used, out of the fourth image forming station 321d and the eighth image forming station 322d, to the facing position of the intermediate transfer belt 33. The moving mechanism moves the eighth image forming station (or the fourth image forming station) not to be used, out of the fourth image forming station 321d and the eighth image forming station 322d, to the position displaced from the facing position of the intermediate transfer belt 33. The eighth image forming station (or fourth image forming station) not to be used becomes in a standby state at the position displaced from the facing position.

The MFP 1 arranges the housing units of the coloring materials and the image forming stations as shown in FIG. 7 and FIG. 8, and thereby the MFP can make the size of the MFP 1 in the width direction (in the drawings, in the left and right direction) small. On the other hand, the MFP 1 arranges the housing units of the coloring materials and the image forming stations as shown in FIG. 1 and FIG. 2, and thereby the MFP 1 can make the size of the MFP 1 in the front-back direction (in the drawings in the front and rear direction) small. The MFP 1 shown in FIG. 7 and FIG. 8 can also be configured like the MFP 1 shown in FIG. 1. The MFP 1 shown in FIG. 7 and FIG. 8 can also be configured like the MFP 1 shown in FIG. 2.

For example, when the MFP 1 shown in FIG. 7 and FIG. 8 is configured like the MFP 1 shown in FIG. 1, in the MFP 1 shown in FIG. 7 and FIG. 8, the housing units to house the coloring materials 51$a$, 61$a$ are arranged along the moving direction (in FIG. 7 and FIG. 8, in the left and right direction) of the intermediate transfer belt, that is, the left and right direction of the main body, and the image forming stations 321$a$, 322$a$ are arranged at the positions facing the housing units to house the coloring materials 51$a$, 61$a$, respectively.

When the MFP 1 shown in FIG. 7 and FIG. 8 is configured like the MFP 1 shown in FIG. 2, in the MFP 1 shown in FIG. 7 and FIG. 8, the housing units to house the coloring materials 51$a$-51$d$, 61$a$-61$d$ are arranged along the moving direction (in FIG. 7 and FIG. 8, in the left and right direction) of the intermediate transfer belt, that is, the left and right direction of the main body, and the first to eighth image forming stations 321$a$-321$d$, 322$a$-322$d$ are arranged at the positions facing the housing units to house the coloring materials 51$a$-51$d$, 61$a$-61$d$, respectively.

For example, the image forming station 321$a$ provided in the MFP 1 shown in FIG. 1 forms a BK monochrome image using the discolorable BK coloring material 51$a$. The image forming station 322$a$ provided in the MFP 1 forms a BK monochrome image using the non-discolorable BK coloring material 61$a$. The MFP 1 has conveying units to convey a sheet on which images have been formed by the image forming stations 321$a$, 322$a$.

When the image forming stations 321$a$, 322$a$ use an electrophotographic system as the image forming system, the MFP 1 has a fixing unit 35. The above-described conveying units convey the image formed sheet to the fixing unit 35. The fixing unit 35 heats the toner image formed on the sheet at a prescribed fixable temperature, to fix the image on the sheet.

The above-described image forming system is not limited to an electrophotographic system. For example, when the image forming stations 321$a$, 322$a$ use an ink jet recording system as the image forming system, each of the image forming stations 321$a$, 322$a$ forms an image using ink as the coloring material on the sheet conveyed by the conveying units.

Color of the monochrome image formed by each of the image forming stations 321$a$, 322$a$ may be optional. The BK image which the image forming station 321$a$ forms is formed using the BK coloring material 51$a$ which can be discolored under a prescribe condition. The coloring material 51$a$ is a BK discolorable toner, or a BK discolorable ink.

The BK image which the image forming station 322$a$ forms is formed using the BK coloring material 61$a$ which can not be discolored under a prescribe condition. The coloring material 61$a$ is a BK non-discolorable toner, or a BK non-discolorable ink.

An example of the above-described prescribed condition is heat (temperature). When the discolorable toner 51$a$ is heated at a prescribed temperature higher than a heating temperature (fixing temperature) of the fixing unit 35 at the time of fixing, the color thereof is erased and discolored. For example, when the toner 51$a$ that is a discolorable coloring material is heated at a prescribed temperature (discoloring temperature) higher than the fixing temperature, the color thereof changes to a color different from the original color. The different color is a transparent color, for example. Accordingly, the fixing unit 35 heats an image formed using the discolorable toner 51$a$ at the discoloring temperature, to discolor the image. In addition, when the discoloring toner 51$a$ is heated at a prescribed temperature (erasing temperature) higher than the above-described discoloring temperature, the color thereof changes from the original color to a transparent color with a permeability of 100%. In other words, when the discolorable toner 51$a$ is heated at the erasing temperature, the color thereof disappears. Hereinafter, it is called decoloring that a color disappears. Accordingly, the fixing unit 35 heats an image formed using the discoloring toner 51$a$ at the erasing temperature, to erase the image. The discolorable ink 51$a$ is decolored or discolored at a heating temperature lower than the discolorable toner 51$a$, depending on the composition of dyes contained in the ink. Another example of the above-described prescribed condition is light (ultraviolet rays and so on). The discolorable ink 51$a$ is decolored or discolored with the radiation of ultraviolet rays and so on, depending on the composition of dyes contained in the ink.

For example, the first to fourth image forming stations 321$a$-321$d$ provided in the MFP 1 shown in FIG. 2 and FIG. 7 form monochrome images of BK, C, M, Y using the discolorable coloring materials 51$a$-51$d$ of BK, C, M, Y, respectively. The MFP 1 has conveying units to convey a sheet on which images have been formed by the image forming stations 321$a$-321$d$.

When the image forming stations 321$a$-321$d$ use an electrophotographic system as the image forming system, the MFP 1 has the fixing unit 35. The above-described conveying units convey the sheet on which toner images of BK, C, M, Y have been formed to the fixing unit 35. The fixing unit 35 heats the toner images formed on the sheet at a prescribed fixing temperature, to fix the images on the sheet.

Also the above-described image forming system of the MFP 1 shown in FIG. 2 and FIG. 7 is not limited to an electrophotographic system. For example, when the image forming stations 321$a$-321$d$ use an ink jet recording system as the image forming system, each of the image forming stations 321$a$-321$d$ forms an image using ink as the coloring material on the sheet conveyed by the conveying units.

Colors of the monochrome images formed by the first to fourth image forming stations 321$a$-321$d$ may be optional. The colors of the above-described monochrome images can variously be combined depending on the characteristics of toners to be used and colors of inks to be used.

The images of the four colors of BK, C, M, Y to be formed by the first to fourth image forming stations 321$a$-321$d$ are formed using the coloring materials 51$a$-51$d$ of BK, C, M, Y which can be discolored under prescribed conditions, respectively. The coloring material 51$a$ is the BK discolorable toner, or the BK discolorable ink, as describe above. The coloring material 51$b$ is the C discolorable toner, or the C discolorable ink, as describe above. The coloring material 51$c$ is the M discolorable toner, or the M discolorable ink, as describe above. The coloring material 51$d$ is the Y discolorable toner, or the Y discolorable ink, as describe above.

The images of the four colors of BK, C, M, Y to be formed by the fifth to eighth image forming stations 322$a$-322$d$ provided in the MFP 1 shown in FIG. 2 and FIG. 7 are formed using the coloring materials 61$a$-61$d$ of BK, C, M, Y which can not be discolored under prescribed conditions, respectively. The coloring material 61$a$ is the BK non-discolorable toner, or the BK non-discolorable ink. The coloring material 61$b$ is the C non-discolorable toner, or the C non-discolorable ink. The coloring material 61c is the M non-discolorable toner, or the M non-discolorable ink. The coloring material 61d is the Y non-discolorable toner, or the Y non-discolorable ink.

An example of the above-described prescribed condition is heat (temperature), as described above. When the discolorable toners 51a-51d are heated at a prescribed temperature higher than a heating temperature (fixing temperature) of the fixing unit 35 at the time of fixing, the colors thereof are erased and discolored. For example, when the toners 51a-51d that are discolorable coloring materials are heated at a prescribed temperature (discolorable temperature) higher than fixing temperature, the colors thereof change to colors different from the original colors. The different colors are a transparent color, for example. Accordingly, the fixing unit 35 heats images formed using the discolorable toners 51a-51d at the discoloring temperature, to discolor the images. In addition, when the discoloring toners 51a-51d are heated at a prescribed temperature (erasing temperature) higher than the above-described discoloring temperature, the colors thereof change from the original colors to a transparent color with a permeability of 100%. In other words, when the discolorable toners 51a-51d are heated at the erasing temperature, the colors thereof disappear. Hereinafter, it is called decoloring that colors disappear. Accordingly, the fixing unit 35 heats the images formed using the discoloring toners 51a-51d at the erasing temperature, to erase the images. The discolorable inks 51a-51d are decolored or discolored at a heating temperature lower than the discolorable toners 51a-51d, depending on the compositions of dyes contained in the inks. Another example of the above-described prescribed condition is light (ultraviolet rays and so on). The discolorable inks 51a-51d are decolored or discolored with the radiation of ultraviolet rays and so on, depending on the compositions of dyes contained in the inks.

A specific example of the discolorable toners 51a-51d which the MFP 1 uses, and the principle of discoloring and decoloring the discolorable toners 51a-51d will be further described.

When the discolorable toners 51a-51d which the MFP 1 uses are heated to a discoloring temperature, discoloring thereof is started. When the discolorable toners 51a-51d are further heated to an erasing temperature, the colors thereof become a transparent color with a permeability of 100%, and are decolored. Specifically, each of the discolorable toners 51a-51d contains a binder resin and a coloring matter. The binder resin is the same as in the conventional and well-known toner (non-discolorable toner). The discolorable toners 51a-51d are characterized in coloring matters. The coloring matter contains a coloring compound, a color developer, a discoloring temperature control agent (temperature control agent). The coloring compound is a color developing agent, and a leuco dye is used, for example. Phenols are used as the color developer, for example. Substance which becomes compatible with the coloring compound when heated and does not have affinity with the color developer is used as the discoloring temperature control agent. The coloring compound generates a color by a mutual action with the color developer, to cause the discolorable toner to develop a prescribed color. When the discolorable toner is heated to not less than the discoloring temperature, the mutual reaction of the coloring compound with the color developer is weakened, and thereby the discolorable toner begins to discolor to a transparent color. When the discolorable toner is further heated to not less than the erasing temperature, the mutual reaction of the coloring compound with the color developer is broken, and thereby the discolorable toner is decolored. The above-described discoloring temperature and erasing temperature can be controlled by arbitrarily combining the discoloring temperature control agents.

Hereinafter, a specific configuration of the MFP 1 will be described with reference to FIG. 7 to FIG. 9. The MFP 1 will be described as one which forms an image by means of an electrophotographic system using toners as the coloring materials 51a-51d, 61a-61d. As shown in FIG. 7 to FIG. 9, the MFP 1 has at least an image forming unit 3, a fixing unit 35, an image reading unit 5, an operation panel 9, and an operation control unit 7. The operation control unit 7 performs signal processing and operation control as described later. The operation control unit 7 is composed of a circuit board. The operation panel 9 has a display unit 9a as described later. The operation panel 9 is arranged at a prescribed position of the MFP 1.

The image forming unit 3 forms a visible image (toner image) corresponding to image data on a recording medium, such as a paper or a resin sheet. The image data may be data generated by the image reading unit 5, or may be data obtained from the outside, for example. The image data obtained from the outside may be data which a portable storage medium such as a semiconductor memory supplies to the MFP 1, and may be data which a supply source such as a PC (Personal Computer) on a network supplies to the MFP 1 through an I/F (Interface) 71 as shown in FIG. 9.

The image forming unit 3 further has the remaining amount detecting unit 30 shown in FIG. 9. The remaining amount detecting unit 30 detects shortage of remaining amounts of the toners 51a-51d, 61a-61d used in the image forming stations 321a-321d, 322a-322d, respectively. Specifically, the remaining amount detecting unit 30 detects that the remaining amounts of the toners 51a-51d, 61a-61d become less than prescribed values, respectively. The image reading unit 5 acquires characters or an image of a document that is a reading target as brightness of light, and generates image data corresponding to the brightness.

The image reading unit 5 includes at least a document table 5a, an illumination device, and an image sensor. The document table 5a supports a document that is the reading target. The document table 5a is composed of a transparent member, such as glass. The illumination device emits light toward the document supported by the document table 5a. The image sensor converts reflected light (image information) from the document into an image signal. The image sensor is a CCD (Charge Coupled Device) sensor or a CMOS (Complementary metal-oxide Semiconductor) sensor, for example.

The above-described operation control unit 7 processes the image signal generated by the image reading unit 5, to convert the above-described image signal into image data suitable for image forming by the image forming unit 3. Specifically, the operation control unit 7 performs, for image forming, prescribed processings, such as character specification, outline correction, color tone correction (color conversion, RGB→CMY, concentration), half tone (gradation) processing, and γ characteristic (input concentration value to output concentration) processing to the image signal from the image sensor. The image signal and the image data are stored in a storage device not shown, such as a HDD (Hard Disk Drive), or a semiconductor memory and so on which is removable from the MFP 1.

The MFP 1 shown in FIG. 1 has an exposure unit 31, and the above-described image forming stations 321a, 322a, as the image forming unit 3. The MFP 1 shown in FIG. 2, FIG. 7 and FIG. 8 has the exposure unit 31, and the above-described image forming stations 321a-321d, 322a-322d.

The MFP 1 shown in FIG. 7 and FIG. 8 further has primary transfer units described later the intermediate transfer belt 33, a secondary transfer unit 34, the above-described fixing unit 35, waste toner collecting mechanisms 36, an intermediate transfer belt cleaner 37 and a waste toner recovery device 38 and so on. The above-described fixing unit 35 functions also as a unit to erase an image and discolor an image.

The image forming unit 3 of the MFP 1 further has a sheet feeding unit, an aligning mechanism 45 and an ADU (Automatically Duplex Unit) 40. The sheet feeding unit includes at least one sheet cassette 41, a manual feed tray, and a second manual feed tray 146. The sheet cassette 41 houses a sheet for image forming. The sheet cassette 41 is detachably loaded in a cassette loading unit provided at the lower portion of the main body of the MFP 1. The image forming unit 3 further has a sheet feeding mechanism 42, a separation mechanism 43, and a conveying mechanism 44, as conveying units provided for each cassette 41.

The manual feed tray 46 holds a sheet for image forming. The manual feed tray 46 is detachably loaded on a first tray loading unit provided at the lower portion of the side face of the main body of the MFP 1. Specifically, the first tray loading unit includes a fulcrum 46a. The manual feed tray 46 is detachably loaded on the fulcrum 46a. The manual feed tray 46 loaded on the fulcrum 46a is supported rotatably around the fulcrum 46a in the direction of an arrow A, and thereby can be opened and closed against the side face of the main body of the MFP 1. The manual feed tray 46 substantially closely contacts the side face of the main body of the MFP 1 in the closed state. The manual feed tray 46 separates from the side face of the main body of the MFP 1 in the open state, and becomes holdable a sheet. Accordingly, when using the manual feed tray 46, a user can open the manual feed tray 46 against the side face of the main body of the MFP 1. When not using the manual feed tray 46, the user can close the manual feed tray 46 against the side face of the main body of the MFP 1.

The image forming unit 3 has a sheet feeding mechanism 47, a separation mechanism 48, and a timing matching mechanism 49, as conveying units for the manual feed tray 46. The fulcrum 46a of the first tray loading unit, the sheet feeding mechanism 47, the separation mechanism 48 and the timing matching mechanism 49 are arranged at the front stage of the aligning mechanism 45.

The sheet feeding mechanism 47 takes out a sheet from the manual feed tray 46. The separation mechanism 48 separates the sheets taken out from the manual feed tray 46 one by one. The timing matching mechanism 49 conveys the sheet which has been separated one by one to the aligning mechanism 45 in matching with the operation of the image forming unit 3.

The second manual feed tray 146 holds a sheet for erasing an image formed on a sheet and for discoloring the image. The second manual feed tray 146 is loaded on a second tray loading unit provided at the upper portion of the side face of the main body of the MFP 1. Specifically, the second tray loading unit includes a fulcrum 146a. The second manual feed tray 146 is detachably loaded on the fulcrum 146a. The second manual feed tray 146 loaded on the fulcrum 146a is supported rotatably around the fulcrum 146a in the direction of an arrow A, and thereby can be opened and closed against the side face of the main body of the MFP 1. The second manual feed tray 146 substantially closely contacts the side face of the main body of the MFP 1 in the closed state. The second manual feed tray 146 separates from the side face of the main body of the MFP 1 in the open state, and becomes holdable a sheet. Accordingly, when using the second manual feed tray 146, a user can open the second manual feed tray 146 against the side face of the main body of the MFP 1. When not using the second manual feed tray 146, the user can close the second manual feed tray 146 against the side face of the main body of the MFP 1.

The image forming unit 3 has a sheet feeding mechanism 147, a separation mechanism 148, and a timing matching mechanism 149 as conveying units for the second manual feed tray 146. A fulcrum 146a of the second tray loading unit, the sheet feeding mechanism 147, the separation mechanism 148 and the timing matching mechanism 149 are arranged at the rear stage of the aligning mechanism 45, and between the transfer position and the fixing unit 35. The above-described transfer position is a position where the intermediate transfer belt 33 and the secondary transfer unit 34 contact.

The sheet feeding mechanism 147 takes out a sheet from the second manual feed tray 146. The separation mechanism 148 separates the sheets taken out from the second manual feed tray 146 one by one. The timing matching mechanism 149 conveys the sheet which has been separated one by one to fixing unit 35 in matching with the operation of the fixing unit 35.

The exposure unit 31 of the MFP 1 shown in FIG. 1 converts the image data outputted from an image processing unit 73 of the operation control unit 7 into strength and weakness of laser light. The exposure unit 31 irradiates a photoconductor drum of the image forming station 321a or the image forming station 322a with the laser light converted from the BK image data. The exposure unit 31 forms an electrostatic latent image on each of the photoconductor drums of the image forming stations 321a, 322a by the laser light irradiation.

The image forming station 321a has the above-described photoconductor drum that is an image carrier, a developing unit and a primary transfer unit. The photoconductor drum of the image forming station 321a is for BK image forming. The photoconductor drum of the image forming station 321a generates an electrostatic latent image corresponding to laser light for forming a BK image which is irradiated by the exposure unit 31. The developing unit of the image forming station 321a supplies the discolorable BK toner 51a to the photoconductor drum for BK image forming, to develop the above-described electrostatic latent image. The developing unit of the image forming station 321a develops the above-described electrostatic latent image, to form an image of the discolorable BK toner 51a on the photoconductor drum for BK image forming. The primary transfer unit of the image forming station 321a transfers the image of the discolorable BK toner 51a which has been formed on the photoconductor drum for BK image forming to the intermediate transfer belt 33.

The intermediate transfer belt 33 primarily holds the image formed by the image forming station of the image forming unit 3. Specifically, the intermediate transfer belt 33 holds the discolorable toner image formed by the image forming station 321a, and conveys the image to the above-described transfer position.

The image forming station 322a forms an image using non-discolorable toner that is the coloring material 61a. In other words, the image forming station 322a forms an image of the non-discolorable BK toner 61a.

The image forming station 322a, similarly as the above-described image forming station 321a, has the above-described photoconductor drum that is an image carrier, a developing unit and a primary transfer unit. The photoconductor drum of the image forming station 322a is for BK image forming. The photoconductor drum of the image forming station 322a generates an electrostatic latent image corresponding to laser light for forming a BK image which is irradiated by the exposure unit 31. The developing unit of the image forming station 322a supplies the non-discolorable BK toner 61a to the photoconductor drum for BK image forming, to develop the above-described electrostatic latent image. The developing unit of the image forming station 322a develops the above-described electrostatic latent image, to form an image of the non-discolorable BK toner 61a on the photoconductor drum for BK image forming. The primary transfer unit of the image forming station 322a transfers the image of the non-discolorable BK toner 61a which has been formed on the photoconductor drum for BK image forming to the intermediate transfer belt 33.

The intermediate transfer belt 33 holds the non-discolorable toner image formed by the image forming station 322a, and conveys the image to the above-described transfer position.

The secondary transfer unit 34 transfers the above-described toner image conveyed by the intermediate transfer belt 33 from the intermediate transfer belt 33 to the sheet at the above-described transfer position.

The fixing unit 35 fixes the above-described toner image transferred from the intermediate transfer belt 33 to the sheet by the secondary transfer unit 34 on the sheet.

Toner (primary transfer remaining toner) remaining on the photoconductor drum of each of the image forming stations 321a, 322a without being transferred from the photoconductor drum to the intermediate transfer belt 33 is removed by a cleaner not shown. The waste toner collecting mechanism 36 collects the primary transfer remaining toner removed by the above-described cleaner, so that the waste toner recovery device 38 described later recovers the primary transfer remaining toner. The waste toner collecting mechanism 36 collects the above-described primary transfer remaining toner, in the vicinity of the above-described primary transfer unit of each of the image forming stations 321a, 322a.

After the secondary transfer by the above-described secondary transfer unit 34, toner which has not been transferred to the sheet remains on the intermediate transfer belt 33 (secondary transfer remaining toner). The intermediate transfer belt cleaner 37 removes and collects the secondary transfer remaining toner from the intermediate transfer belt 33, so that the waste toner recovery device 38 described later recovers the secondary transfer remaining toner. The intermediate transfer belt cleaner 37 collects the secondary transfer remaining toner in the vicinity of the secondary transfer unit 34.

The waste toner recovery device 38 recovers the primary transfer remaining toners collected by the waste toner collecting mechanisms 36, and the secondary transfer remaining toner collected by the intermediate transfer belt cleaner 37.

The sheet feeding mechanism 42 takes out a sheet from the sheet cassette 41 in response to the image forming operation in the image forming stations 321a, 322a. The separation mechanism 43 separates the sheets taken out by the sheet feeding mechanism 42, one by one. The conveying mechanism 44 conveys the sheet separated one by one by the separation mechanism 43 to the aligning mechanism 45. The aligning mechanism 45 conveys the sheet to the above-described transfer position in matching with the timing of the image forming operation in the image forming stations 321a, 322a. Accordingly, the sheet taken out from the sheet cassette 41 by the sheet feeding mechanism 42 and separated one by one by the separation mechanism 43 moves to the above-described transfer position through the conveying mechanism 44 and the aligning mechanism 45.

When the MFP 1 forms an image on a sheet, the fixing unit 35 heats and pressurizes the sheet and the toner image electrostatically attached to the sheet at a fixing temperature, to fix the toner image to the sheet. Specifically, the toner electrostatically transferred to the sheet by the secondary transfer unit 34 is heated by the fixing unit 35 at the fixing temperature, and is melt. In the toner, the coloring compound generates a color by the action with the color developer, and thereby the toner develops a prescribed color. While keeping the state to develop the prescribed color, the above-described melted toner is pressurized by the fixing unit 35, and thereby the toner image is fixed to the sheet.

The MFP 1 has a discharge unit and a discharge roller not shown. The discharge unit is provided in a space portion between the reading unit 5 and the image forming unit 3. The discharge unit holds a sheet to be discharged outside the MFP 1. The discharge roller is provided at the back stage of the fixing unit 35. The discharge roller discharges the sheet on which the toner image has been fixed to the above-described discharge unit, in cooperation with the fixing unit 35. In the case of forming images on both faces of a sheet, the above-described discharge roller inversely rotates, to send the sheet which has been discharged partway in the discharge unit into the ADU 40.

The exposure unit 31 of the image forming unit 3 converts the image data outputted by the image processing unit 73 of the operation control unit 7 into strength and weakness of laser light, as described above. The exposure unit 31 irradiates the photoconductor drums of the first to fourth image forming station 321a-321d or the fifth to eighth image forming station 322a-322d with the laser lights converted from the image data of the respective colors of BK, C, M, Y. Or the exposure unit 31 irradiates the photoconductor drum of the first image forming station 321a or the fifth image forming station 322a, the photoconductor drum of the second image forming station 321b or the sixth image forming station 322b, the photoconductor drum of the third image forming station 321c or the seventh image forming station 322c, and the photoconductor drum of the fourth image forming station 321d or the eighth image forming station 322d, with the laser light converted from the image data.

The exposure unit 31 forms an electrostatic latent image on each of the photoconductor drums of the first to eighth image forming stations 321a-321d, 322a-322d by the laser light irradiation.

For example, when the MFP 1 forms a full color image using the discolorable toners 51a-51d, the exposure unit forms an electrostatic latent image on each of the photoconductor drums of the first to fourth image forming stations 321a-321d by the laser light irradiation. The image forming stations 321a-321d develop the above-described electrostatic latent images using the discolorable toners 51a-51d of colors of BK, C, M, Y, to form the images of the discolorable toners 51a-51d of the colors of BK, C, M, Y on the photoconductor drums, as the visualized images, respectively.

Each of the first to fourth image forming stations 321a-321d has the above-described photoconductor drum that is an image carrier, the developing unit and the primary transfer unit. The photoconductor drum of the image forming station 321a is for BK image forming. The photoconductor drum of the image forming station 321a generates an electrostatic latent image corresponding to the laser light for forming a BK image which is irradiated by the exposure unit 31. The developing unit of the image forming station 321a supplies the discolorable BK toner 51a to the photoconductor drum for BK image forming, to develop the above-described electrostatic latent image. The developing unit of the image forming station 321a develops the above-described electrostatic latent image, to form an image of the discolorable BK toner 51a on the photoconductor drum for BK image forming. The primary transfer unit of the image forming station 321a transfers the image of the discolorable BK toner 51a which has been formed on the photoconductor drum for BK image forming to the intermediate transfer belt 33.

The photoconductor drum of the image forming station 321b is for C image forming. The photoconductor drum of the image forming station 321b generates an electrostatic latent image corresponding to the laser light for forming a C image which is irradiated by the exposure unit 31. The developing unit of the image forming station 321b supplies the discolorable C toner 51b to the photoconductor drum for C image forming, to develop the above-described electrostatic latent image. The developing unit of the image forming station 321b develops the above-described electrostatic latent image, to form an image of the discolorable C toner 51b on the photoconductor drum for C image forming. The primary transfer unit of the image forming station 321b transfers the image of the discolorable C toner 51b which has been formed on the photoconductor drum for C image forming to the intermediate transfer belt 33.

The photoconductor drum of the image forming station 321c is for M image forming. The photoconductor drum of the image forming station 321c generates an electrostatic latent image corresponding to the laser light for forming an M image which is irradiated by the exposure unit 31. The developing unit of the image forming station 321c supplies the discolorable M toner 51c to the photoconductor drum for M image forming, to develop the above-described electrostatic latent image. The developing unit of the image forming station 321c develops the above-described electrostatic latent image, to form an image of the discolorable M toner 51c on the photoconductor drum for M image forming. The primary transfer unit of the image forming station 321c transfers the image of the discolorable M toner 51c which has been formed on the photoconductor drum for M image forming to the intermediate transfer belt 33.

The photoconductor drum of the image forming station 321d is for Y image forming. The photoconductor drum of the image forming station 321d generates an electrostatic latent image corresponding to the laser light for forming a Y image which is irradiated by the exposure unit 31. The developing unit of the image forming station 321d supplies the discolorable Y toner 51d to the photoconductor drum for Y image forming, to develop the above-described electrostatic latent image. The developing unit of the image forming station 321d develops the above-described electrostatic latent image, to form an image of the discolorable Y toner 51d on the photoconductor drum for Y image forming. The primary transfer unit of the image forming station 321d transfers the image of the discolorable Y toner 51d which has been formed on the photoconductor drum for Y image forming to the intermediate transfer belt 33.

In the case of forming a full color image, images of the above-described discolorable toners 51a-51d of the four colors are superposed and transferred to the intermediate transfer belt 33. The arrangement position of the image forming stations 321a-321d, in other words, an order by which the images of the discolorable toners 51a-51d are formed on the intermediate transfer belt 33 is determined in accordance with the image forming process and the characteristics of the toners.

The intermediate transfer belt 33 holds the images of the discolorable toners formed by the first to fourth image forming stations 321a-321d, and transfers the images to the above-described transfer position.

When the MFP 1 forms an image using the non-discolorable toners 61a-61d, the exposure unit 31 forms an electrostatic latent image on each of the photoconductor drums of the image forming stations 322a-322d by the above-described laser light irradiation. The image forming stations 322a-322d develop the above-described electrostatic latent images using the non-discolorable toners 61a-61d of colors of BK, C, M, Y, to form the images of the non-discolorable toners 61a-61d of the colors of BK, C, M, Y on the photoconductor drums, as the visualized images, respectively.

Each of the fifth to eighth image forming stations 322a-322d has the above-described photoconductor drum that is an image carrier, the developing unit and the primary transfer unit, similarly as the above-described first to fourth image forming stations 321a-321d.

The photoconductor drum of the image forming station 322a is for BK image forming. The photoconductor drum of the image forming station 322a generates an electrostatic latent image corresponding to the laser light for forming a BK image which is irradiated by the exposure unit 31. The developing unit of the image forming station 322a supplies the non-discolorable BK toner 61a to the photoconductor drum for BK image forming, to develop the above-described electrostatic latent image. The developing unit of the image forming station 322a develops the above-described electrostatic latent image, to form an image of the non-discolorable BK toner 61a on the photoconductor drum for BK image forming. The primary transfer unit of the image forming station 322a transfers the image of the non-discolorable toner 61a which has been formed on the photoconductor drum for BK image forming to the intermediate transfer belt 33.

The photoconductor drum of the image forming station 322b is for C image forming. The photoconductor drum of the image forming station 322b generates an electrostatic latent image corresponding to the laser light for forming a C image which is irradiated by the exposure unit 31. The developing unit of the image forming station 322b supplies the non-discolorable C toner 61b to the photoconductor drum for C image forming, to develop the above-described electrostatic latent image. The developing unit of the image forming station 322b develops the above-described electrostatic latent image, to form an image of the non-discolorable toner 61b on the photoconductor drum for C image forming. The primary transfer unit of the image forming station 322b transfers the image of the non-discolorable toner 61b which has been formed on the photoconductor drum for C image forming to the intermediate transfer belt 33.

The photoconductor drum of the image forming station 322c is for M image forming. The photoconductor drum of the image forming station 322c generates an electrostatic latent image corresponding to the laser light for forming an M image which is irradiated by the exposure unit 31. The developing unit of the image forming station 322c supplies the non-discolorable M toner 61c to the photoconductor drum for M image forming, to develop the above-described electrostatic latent image. The developing unit of the image forming station 322c develops the above-described electrostatic latent image, to form an image of the non-discolorable M toner 61c on the photoconductor drum for M image forming. The primary transfer unit of the image forming station 322c transfers the image of the non-discolorable toner 61c which has been formed on the photoconductor drum for M image forming to the intermediate transfer belt 33.

The photoconductor drum of the image forming station 322*d* is for Y image forming. The photoconductor drum of the image forming station 322*d* generates an electrostatic latent image corresponding to the laser light for forming a Y image which is irradiated by the exposure unit 31. The developing unit of the image forming station 322*d* supplies the non-discolorable Y toner 61*d* to the photoconductor drum for Y image forming, to develop the above-described electrostatic latent image. The developing unit of the image forming station 322*d* develops the above-described electrostatic latent image, to form an image of the non-discolorable toner 61*d* on the photoconductor drum for Y image forming. The primary transfer unit of the image forming station 322*d* transfers the image of the non-discolorable toner 61*d* which has been formed on the photoconductor drum for Y image forming to the intermediate transfer belt 33. In the case of forming a full color image, images of the above-described four non-discolorable toners 61*a*-61*d* of the four colors are superposed and transferred to the intermediate transfer belt 33. The arrangement position of the fifth to eighth image forming stations 322*a*-322*d*, in other words, an order by which the images of the non-discolorable toners 61*a*-61*d* are formed on the intermediate transfer belt 33 is determined in accordance with the image forming process and the characteristics of the toners.

The intermediate transfer belt 33 holds the images of the non-discolorable toners formed by the fifth to eighth image forming stations, and transfers the images to the above-described transfer position.

The above-described secondary transfer unit 34 transfers the above-described toner image conveyed by the intermediate transfer belt 33 from the intermediate transfer belt 33 to the sheet at the above-described transfer position.

The fixing unit 35 fixes the above-described toner image transferred from the intermediate transfer belt 33 by the secondary transfer unit 34 to the sheet.

The toner (primary transfer remaining toner) remaining on the photoconductor drum of each of the first to eighth image forming stations without being transferred from the photoconductor drum to the intermediate transfer belt 33 is removed by a cleaner not shown. The waste toner collecting mechanism 36 collects the primary transfer remaining toner removed by the above-described cleaner, so that the waste toner recovery device 38 described later recovers the primary transfer remaining toner. The waste toner collecting mechanism 36 collects the above-described primary transfer remaining toner, in the vicinity of each of the above-described primary transfer units of the image forming stations.

After the secondary transfer by the above-described secondary transfer unit 34, toner which has not been transferred to the sheet remains on the intermediate transfer belt 33 (secondary transfer remaining toner). The intermediate transfer belt cleaner 37 removes and collects the secondary transfer remaining toner from the intermediate transfer belt 33, so that the waste toner recovery device 38 described later recovers the secondary transfer remaining toner. The intermediate transfer belt cleaner 37 collects the secondary transfer remaining toner in the vicinity of the secondary transfer unit 34.

The waste toner recovery device 38 recovers the primary transfer remaining toners collected by the waste toner collecting mechanisms 36, and the secondary transfer remaining toner collected by the intermediate transfer belt cleaner 37.

The sheet feeding mechanism 42 takes out the sheet from the sheet cassette 41 in response to the image forming operation in the first to eighth image forming stations. The separation mechanism 43 separates the sheets taken out by the sheet feeding mechanism 42, one by one. The conveying mechanism 44 conveys the sheet separated one by one by the separation mechanism 43 to the aligning mechanism 45. The aligning mechanism 45 conveys the sheet to the above-described transfer position in matching with the timing of the image forming operation in the first to eighth image forming stations. Accordingly, the sheet taken out from the sheet cassette 41 by the sheet feeding mechanism 42 and separated one by one by the separation mechanism 43 moves to the above-described transfer position through the conveying mechanism 44 and the aligning mechanism 45.

When the MFP 1 forms an image on a sheet, the fixing unit 35 heats and pressurizes the sheet and the toner image electrostatically attached to the sheet at a fixing temperature, to fix the toner image to the sheet. Specifically, the toner electrostatically transferred to the sheet by the secondary transfer unit 34 is heated by the fixing unit 35 at the fixing temperature, and is melt. In the toner, the coloring compound generates a color by the action with the color developer, and thereby the toner develops a prescribed color. While keeping the state to develop the prescribed color, the above-described melted toner is pressurized by the fixing unit 35, and thereby the toner image is fixed to the sheet.

The MFP 1 has a discharge unit and a discharge roller not shown. The discharge unit is provided in a space portion between the reading unit 5 and the image forming unit 3. The discharge unit holds a sheet discharged outside the MFP 1. The discharge roller is provided at the back stage of the fixing unit 35. The discharge roller discharges the sheet on which the toner image has been fixed to the above-described discharge unit, in cooperation with the fixing unit 35. In the case of forming images on both faces of a sheet, the above-described discharge roller inversely rotates, to send the sheet which has been discharged partway in the discharge unit into the ADU 40. The ADU 40 conveys the sheet which has been sent therein by the discharge roller to the aligning mechanism 45 again. The sheet is conveyed to the aligning mechanism 45 in the state in which the front and back of the sheet are reversed, so that a toner image is transferred to a second face (a rear face, for example) that becomes a back face of a first face (a front face, for example) on which the toner image has been fixed.

The ADU 40 is supported rotatably around a fulcrum 40*a* in the direction of an arrow A, as shown in FIG. 8, and thereby can be opened and closed against the side face of the main body of the MFP 1. The ADU 40 substantially closely contacts the side face of the main body of the MFP 1 in the closed state as shown in FIG. 7, so as to cover the fulcrum 146*a* of the second tray loading unit and the second manual feed tray 146 loaded on the fulcrum 146*a*. The ADU 40 becomes usable in the closed state.

The ADU 40 separates from the side face of the main body of the MFP 1 in the open state, so that the fulcrum 146*a* of the second tray loading unit and the second manual feed tray 146 loaded on the fulcrum 146*a* are exposed, as shown in FIG. 8. For example, when sheet jam occurs in the MFP 1, a user can open the ADU 40 against the side face of the main body of the MFP 1, so as to remove the sheet from the MFP 1.

When the ADU 40 is in the closed state (when the ADU 40 is used), since the fulcrum 146*a* of the second tray loading unit is covered with the ADU 40, a user can not load the second tray 146 on the fulcrum 146*a*, and can not unload it from the fulcrum 146*a*. In addition, when the ADU 40 is in the closed state, since the second manual feed try 146 loaded on the fulcrum 146*a* is covered with the ADU 40, a user can not also open the second manual feed tray 146.

On the other hand, when the ADU is in the open state (when the ADU 40 is not used), since the fulcrum 146*a* of the second tray loading unit is exposed, a user can load the second manual feed tray 146 on the fulcrum 146a, and can unload it from the fulcrum 146a. In addition, when the ADU 40 is in the open state, since the second manual feed tray 146 loaded on the fulcrum 146a is exposed, a user can also open the second manual feed tray 146.

In other words, the second manual feed tray 146 becomes unusable when the ADU 40 is in the closed state, and becomes usable when the ADU 40 is in the open state. It is not necessary that the second manual feed tray 146 is usually loaded on the fulcrum 146a of the second tray loading unit. A user may load the second manual feed tray 146 on the fulcrum 146a, only when erasing the image formed on the sheet and discoloring the image.

The second manual feed tray 146 has the same structure as the manual feed tray 46. Accordingly, as shown in FIG. 8, a user can unload the manual feed tray 46 from the fulcrum 46a in the direction of an arrow B, and can load the unloaded manual feed tray 46 on the fulcrum 146a of the second tray loading unit, in the direction of an arrow C. The manual feed tray 46 is made usable as the second manual feed tray 146, and thereby the component cost in the MFP 1 can be reduced.

A control configuration of the MFP 1 will be described with reference to FIG. 9. FIG. 9 is a block diagram showing a control configuration of the MFP 1 according to the first embodiment. As shown in FIG. 9, the operation control unit 7 has the I/F 71 that is an image input unit, the image processing unit 73, and a modulation circuit 75 that is an exposure signal generating unit. The I/F 71 accepts image data supplied from an external device such as a PC, or image data supplied through a network or the like. The image processing unit 73 performs prescribed image processings regarding the character specification, outline correction, tone correction, and γ characteristic and so on described above, to the image signal generated by the image reading unit 5 or the image data from the I/F 71. The modulation circuit 75 converts the image data processed by the image processing unit 73 into a modulation signal (exposure signal) for laser light by the exposure unit 31.

The operation control unit 7 has a CPU (Central Processing Unit) 77, and an MPU (Main Processing Unit) 79. The CPU 77 controls an image signal system such as the I/F 71, the image processing unit 73, and the modulation circuit 75. The MPU 79 connects to the CPU 77, and controls an operation of the whole MFP 1 including the image forming unit 3 and the image reading unit 5. For example, the MPU 79 controls an image reading operation of the image reading unit 5, an image forming operation of the image forming unit 3, and a heating temperature of the fixing unit 35 at the time of an image erasing operation and an image discoloring operation described later.

The heating temperature of the fixing unit 35 is controlled by the MPU 79 so as to be changed from a fixing temperature to an erasing temperature at the time of image erasing operation, as described later. The heating temperature of the fixing unit 35 is controlled by the MPU 79 so as to be changed from the fixing temperature to a discoloring temperature at the time of image discoloring operation. The heating temperature of the fixing unit 35 is controlled by the MPU 79 so as to be changed from the erasing temperature or the discoloring temperature to the fixing temperature at the time of image forming operation.

The MPU 79 controls the respective units of the MFP 1 according to a control input from the operation panel 9 which accepts a user instruction for the MFP 1. The operation panel 9 has a plurality of keys and the display panel 9a. The plurality of keys of the operation panel 9 include a start key which accepts a start instruction by a user relating operations, such as image forming, image erasing, and image discoloring.

The display panel 9a displays the states of the respective units of the MFP 1, such as a waiting time for changing the heating temperature of the fixing unit 35 at the time of image erasing, image discoloring, and fixing for image forming, and so on, by a user interface widely known as a character string or a sign (pictogram/icon). The display panel 9a accepts the control input by the user, and displays the contents of the accepted input. The display panel 9a displays the above-described various contents according to the control of the MPU 79. The MPU connects to an I/F (Interface) 72 for inputting and outputting information between the MPU 79 and the operation panel 9.

The operation control unit 7 has a ROM (Read Only Memory) 111 that stores a program, a RAM (Random Access Memory) 113, an NVM (Non-volatile Memory) 115, a page memory 117 and an I/O port (Input/Output Port) 119. The page memory 117 is a work memory to provide a work area of an image processing in the image processing unit 73. The MPU 79 connects to the ROM 111, the RAM 113, and the I/O port 119. The I/O port 119 inputs the output of a sensor 120 to the MPU 79.

The sensor 120 includes an ADU sensor to detect opening and closing of the ADU 40, and a tray sensor to detect a usable state of any one of the manual feed tray 46 and the second manual feed tray 146. The usable state of any one of the manual feed tray 46 and the second manual feed tray 146 is a state indicating on which one of the fulcrum 46a and the fulcrum 146a, the manual feed tray 46 or the second manual feed tray 146 is mounted. The sensor 120 further includes a temperature sensor to detect a heating temperature of the fixing unit 35, a sheet sensor to detect presence or absence of a sheet in the manual feed trays 46, 146, and a discharge sensor to detect that the sheet passes through the fixing unit 35, for example. The MPU 79 connects to a sensor S1. The sensor S1 reads out a test pattern formed on the intermediate transfer belt 33 for image stabilization processing.

The MPU 79 connects to a motor driver 121 to control rotation of arbitrary motors 131, 133, 139 and so on. The motor 131 drives the image forming stations 321a to 322d and the intermediate transfer belt 33 and so on, for example. The motor 133 drives the sheet conveying units from the cassette to the fixing unit 35 and the ADU 40, such as the sheet feeding mechanism 42, the separation mechanism 43, the conveying mechanism 44, the aligning mechanism 45, and the secondary transfer unit 34. Furthermore, the motor 133 drives the sheet conveying units from the manual feed tray 46 to the fixing unit 35, such as the sheet feeding mechanism 47, the separation mechanism 48, and the timing matching mechanism 49. The motor 133 further drives the sheet conveying units from the second manual feed tray 146 to the fixing unit 35, such as the sheet feeding mechanism 147, the separation mechanism 148, and the second timing matching mechanism 149, and so on.

The motor 139 drives the fixing unit 35 independently from the above-described conveying units 42-45, 47-49, 147-149. The motor 133 drives any one conveying units of the conveying units 47-49 and the conveying units 147-149, and stops driving of the other conveying units, according to an output (detection result) of the tray sensor of the sensor 20. It is possible to drive the conveying units 47-49 and the conveying units 147-149 by independent motors.

The MPU 79 connects to a heater control device 123 to drive a heater 35a for changing the heating temperature of the fixing unit 35. The heater control device 123 is a temperature control unit to control the heating temperature of the fixing unit 35 to a standby temperature, the fixing temperature, the discoloring temperature, and the erasing temperature, described later. Specifically, the heater control device 123 controls heating of the heater that is a heat source of the fixing unit 35. As will be described later, the heating temperature of the fixing unit 35 can be changed by the heater 35a, and thus the fixing unit 35 operates for fixing the image formed on the sheet, erasing the image, and discoloring the image.

Figure 10:
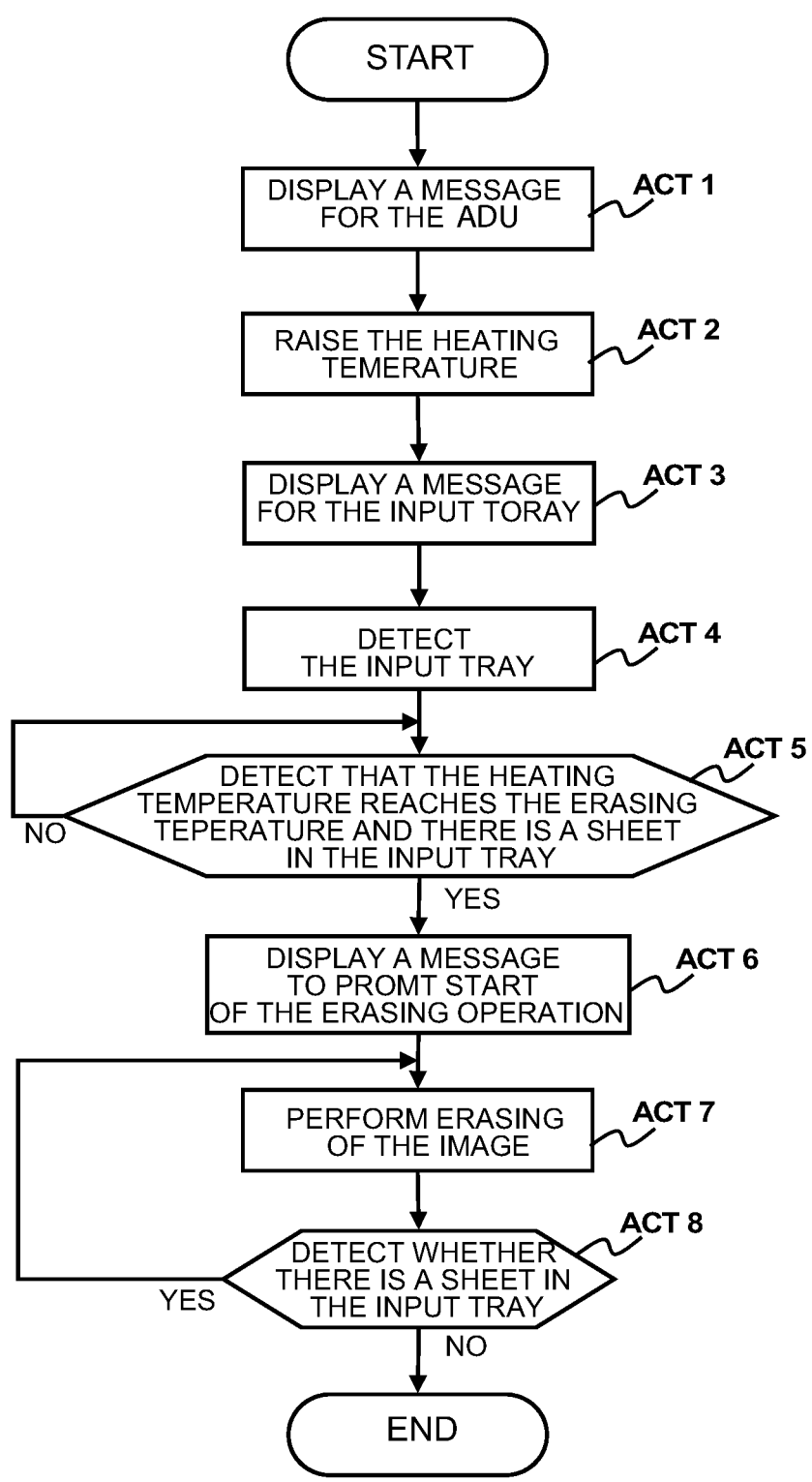
FIG. 10 is a flowchart showing an example of an erasing operation of the image forming apparatus according to the first and second embodiments.

An image erasing operation of the MFP 1 will be described with reference to FIG. 10. FIG. 10 is a flowchart showing an image erasing operation of the MFP 1.

The discolorable toner which is used in the image (toner image) of the sheet decolors when heated at the erasing temperature, as described above. Specifically, in the discolorable toner, the action of the color developer to the coloring compound (precursor compound of coloring matter) is broken, and the coloring state is resolved, and thus the discolorable toner decolors. The discolorable toner decolors, to cause the image of the sheet to be erased. In addition, when heated at the discoloring temperature, the discolorable toner which is used in the image of the sheet discolors from the original color to a transparent color, for example. The discolorable toner discolors, to cause the image of the sheet to be discolored.

The fixing unit 35 has a roller incorporating the heater 35a. The heater 35a is a heater lamp, for example. The fixing unit 35 may be a configuration having an IH (Induction Heating Coil) heater to cause induction heat on a metal face of the roller, as the heater 35a. The fixing unit 35 may have a belt in place of the roller, and may be a configuration having an IH (Induction Heating Coil) heater to cause induction heat on a metal layer of the belt, as the heater 35a.

The fixing unit 35 heats the image on the sheet by the heater 35a. The fixing unit 35 can change the heating temperature by the heater 35a to the fixing temperature, the discoloring temperature higher than the fixing temperature, and the erasing temperature. When the heating temperature of the fixing unit 35 is the fixing temperature, the fixing unit 35 fixes the image of the sheet, as described above. When the heating temperature of the fixing unit 35 is the above-described erasing temperature, the fixing unit 35 heats the image of the sheet at the erasing temperature, to decolor the toner and thereby erase the image of the sheet. When the heating temperature of the fixing unit 35 is the above-described discoloring temperature, the fixing unit 35 heats the image of the sheet at the discoloring temperature, to discolor the toner to a transparent color, for example, and thereby discolor the image of the sheet. Without independently having a unit for erasing the image and discoloring the image, the MFP 1 can erase the image of the sheet and discolor the image by the fixing unit 35.

When the MFP 1 performs an operation to erase the image of the sheet, if the operation panel 9 accepts selection of the image erasing operation by a user, in an ACT 1 as shown in FIG. 10, the operation control unit 7 makes the display panel 9a display a message such as "Please open ADU" or the like.

In an ACT 2, the operation control unit 7 instructs the heater driving device 123 to control the heater 35a. The heater driving device 123 starts a first temperature control of the heater 35a so as to raise the heating temperature of the fixing unit 35 to the above-described erasing temperature, according to the instruction from the operation control unit 7.

In ACT 3, the control unit 7 judges whether or not the ADU 40 is opened, based on the detection result of the Above-described ADU sensor which is inputted to the operation control unit 7 through the I/O port 119. When the operation control unit 7 judges that the ADU 40 is opened as shown in FIG. 8, the operation control unit 7 makes the display panel 9a display a message for prompting the user to prepare the image erasing operation, such as "Please load manual feed tray into ADU" or the like.

In an ACT 4, the operation control unit 7 judges whether or not the manual feed tray 46 or the second manual feed tray 146 is loaded on the fulcrum 146a, based on the detection result of the above-described tray sensor which is inputted through the I/O port 119. Hereinafter, the description will be made assuming that the manual feed tray 46 is loaded on the fulcrum 146a. When the operation control unit 7 judges that the manual feed tray 46 is loaded on the rotation fulcrum 146a as shown in FIG. 8, the operation of the MFP 1 proceeds to an ACT 5.

In the ACT 5, the operation control unit 7 judges whether or not the heating temperature of the fixing unit 35 reaches the above-described erasing temperature, based on the detection result of the above-described temperature sensor which is inputted through the I/O port 119. Furthermore, in the above-described ACT 5, the operation control unit 7 judges whether or not there is a sheet in the manual feed tray 46 loaded on the fulcrum 146a, based on the detection result of the above-described sheet sensor which is inputted through the I/O port 119. When the operation control unit 7 judges that there is no sheet in the manual feed tray 46, the operation control unit 7 makes the display panel 9a display a message for prompting preparation of the image erasing operation, such as "Please place sheet on manual feed tray" or the like. When the operation control unit 7 judges that the heating temperature of the fixing unit 35 reaches the above-described erasing temperature, and there is a sheet in the manual feed tray 46 (YES in ACT 5), the operation of the MFP 1 proceeds to an ACT 6.

In the ACT 6, the operation control unit 7 makes the display panel 9a display a message for prompting start of the image erasing operation, such as "Please turn ON start key" or the like. In the above-described ACT 6, when the operation control unit 7 judges that the operation panel 9 accepts that the start key is turned ON, the operation of the MFP 1 proceeds to an ACT 7.

In the ACT 7, the operation control unit 7 instructs the motor driver 121 to control driving of the motor 133 and the motor 139. The motor driver 121 controls the motor 133 so that the above-described conveying units 147-149 are driven. The motor 133 drives the conveying units 147-149. The conveying units 147-149 convey the sheet from the manual feed tray 46 loaded on the fulcrum 146a to the fixing unit 35. The motor driver 121 controls the motor 139 so that the above-described the fixing unit 35 is driven.

The motor 139 drives the fixing unit 35. The fixing unit 35 erases the image of the sheet while conveying the sheet. In the above-described ACT 7, the operation control unit 7 judges whether or not the sheet has passed through the fixing unit 35, in other words, the erasing of the image of one sheet has been completed, based on the detection result of the above-described discharge sensor which is inputted through the I/O port 119. When the operation control unit 7 judges that the erasing of the image of the one sheet has been completed, the operation of the MFP 1 proceeds to an ACT 8.

In the ACT 8, the operation control unit 7 judges whether or not there is a sheet in the manual feed tray 46 loaded on the fulcrum 146a, based on the detection result of the above-described sheet sensor which is inputted through the I/O port 119. When the operation control unit 7 judges that there is a sheet in the manual feed tray 46 (YES in ACT 8), the operation of the MFP 1 returns to the ACT 7. When the operation control unit 7 judges that there is no sheet in the manual feed tray 46 (NO in ACT 8), the image erasing operation of the MFP 1 ends, and the MFP 1 becomes in a standby state.

Since the ADU 40 is in the open state during the image erasing operation of the above-described ACT 7, the motor driver 121 controls the motor 133 and the motor 139 so that only the fixing unit 35 and the conveying units 147-149 are driven. Accordingly, since power consumed by the motor 131 or the like to drive the image forming stations 321a-322d becomes unnecessary, it is possible to save power consumption of the MFP 1. The MFP 1 can perform the image discoloring operation, as described above. The image discoloring operation is the same as the image erasing operation which has been described with reference to FIG. 10, except that the heating temperature of the fixing unit 35 is changed to the discoloring temperature in place of the erasing temperature. Accordingly, the description of the image discoloring operation will be omitted.

Figure 11:
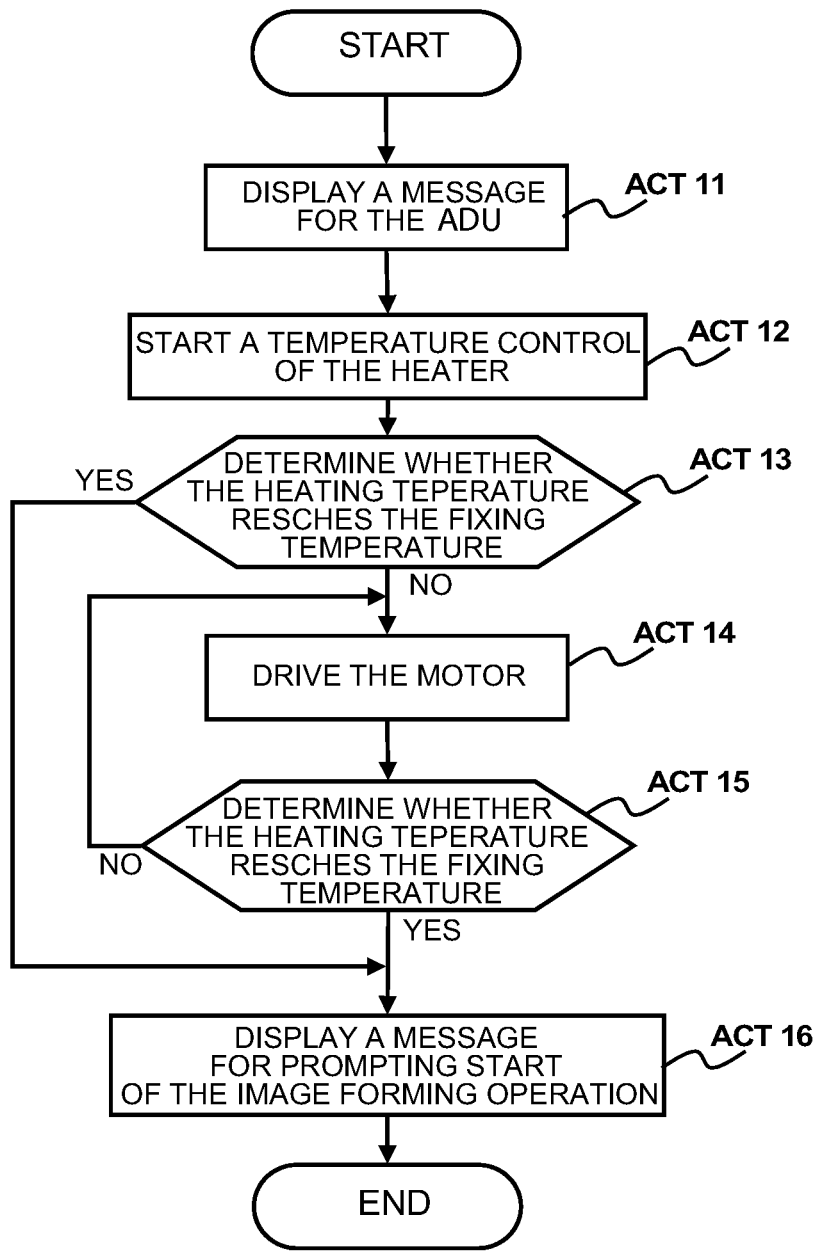
FIG. 11 is a flowchart showing an example of a return processing from an erasing operation to an image forming operation of the image forming apparatus according to the first and second embodiments.

An operation of the MFP 1 returning from the above-described image erasing operation to the image forming operation will be described with reference to FIG. 11. FIG. 11 is a flowchart for describing the returning operation from the image erasing operation to the image forming operation in the MFP 1.

In the image erasing operation of FIG. 10, in order to erase the image of the sheet, the heating temperature of the fixing unit 35 is changed to the above-described erasing temperature higher than the above-described fixing temperature. Accordingly, when the image forming operation is instructed by a user, a temperature control is necessary to lower the heating temperature of the fixing unit 35 from the erasing temperature to the fixing temperature.

As shown in FIG. 11, in an ACT 11, when the operation panel 9 accepts termination of the image erasing operation, such as selection of the image forming operation, by the user, the operation control unit 7 makes the display panel 9a of the operation panel 9 display a message, such as "Please unload manual feed tray from ADU, and close ADU" or the like.

In an ACT 12, the operation control unit 7 instructs the heater driving device 123 to control the heater 35a. The heater driving device 123 starts a second temperature control of the heater 35a so as to lower the heating temperature of the fixing unit 35 to the fixing temperature, according to the instruction from the operation control unit 7.

In an ACT 13, the operation control unit 7 judges whether or not the heating temperature of the fixing unit 35 reaches the above-described fixing temperature, based on the detection result of the above-described temperature sensor which is inputted through the I/O port 119.

Specifically, the operation control unit 7 predicts whether or not a time required for the heating temperature of the fixing unit 35 to reach the above-described fixing temperature is longer than a prescribed time, for example. In the above-described ACT 13, when the operation control unit 7 predicts that the time required for the heating temperature of the fixing unit 35 to reach the above-described fixing temperature is longer than the prescribed time. (NO in the above-described ACT 13), the operation of the MFP 1 proceeds to an ACT 14.

In the ACT 14, the operation control unit 7 instructs the motor driver 121 to control driving of the motor 139. The motor driver 121 controls only the motor 139. The motor 139 operates for a prescribed time, to drive the fixing unit 35. The fixing unit 35 is driven, and thereby the decrease of the heating temperature of the fixing unit 35 is promoted. The case in which the operation control unit 7 predicts that the time required for the heating temperature of the fixing unit 35 to reach the above-described fixing temperature is longer than the prescribed time is a case in which the heating temperature of the fixing unit 35 is higher than the fixing temperature, and the difference between the heating temperature and the fixing temperature is not less than 10% of the fixing temperature, for example.

In an ACT 15, after the fixing unit 35 has been driven for the above-described prescribed time, the operation control unit 7 judges whether or not the heating temperature of the fixing unit 35 reaches the above-described fixing temperature, based on the detection result of the above-described temperature sensor which is inputted through the I/O port 119 again. Specifically, as described above, the operation control unit 7 predicts whether or not the time required for the heating temperature of the fixing unit 35 to reach the above-described fixing temperature is longer than the above-described prescribed time.

In the above-described ACT 15, when the operation control unit 7 predicts that the time required for the heating temperature of the fixing unit 35 to reach the above-described fixing temperature is longer than the prescribed time (NO in the above-described ACT 15), the operation of the MFP 1 returns to the above-described ACT 14. In the above-described ACT 14, the motor driver 121 controls only the motor 139, as described above. The motor 139 drives the fixing unit 35.

In the above-described ACT 13, when the operation control unit 7 predicts that the time required for the heating temperature of the fixing unit 35 to reach the fixing temperature is within the range of the above-described prescribed time (YES in the above-described ACT 13), the operation of the MFP 1 proceeds to an ACT 16. Furthermore, in the above-described ACT 15, when the operation control unit 7 predicts that the time required for the heating temperature of the fixing unit 35 to reach the fixing temperature is within the range of the prescribed time (YES in the above-described ACT 15), the operation of the MFP 1 proceeds to the ACT 16. The case in which the operation control unit 7 predicts that the time required for the heating temperature of the fixing unit 35 to reach the fixing temperature is within the range of the pre-scribed time is a case in which the heating temperature of the fixing unit 35 is higher than the fixing temperature, but the difference between the heating temperature and the fixing temperature is less than 10% of the fixing temperature, for example.

In the ACT 16, the operation control unit 7 makes the display panel 9a of the operation panel 9 display a message for prompting the image forming operation of the user, such as "Ready to copy" or the like. After the message for prompting the image forming operation of the user is displayed, a little time lag may occur until actually the temperature of the fixing unit 35 completely becomes the fixing temperature. However, the time lag is not to such an extent that the user is aware of an undesired waiting time. For example, in consideration of the occurrence of the above-described time lag, the display panel 9a may display a message such as "Please wait for about 10 seconds" or the like. The returning operation from the image discoloring operation to the image forming operation is the same as the returning operation from the image erasing operation to the image forming operation which has been described with reference to FIG. 11. Accordingly, the description of the returning operation from the image discoloring operation to the image forming operation will be omitted.

Hereinafter, switching of the image forming by a print mode will be described.

The MFP 1 shown in FIG. 1, FIG. 2, and FIG. 7-FIG. 9 can form an image by a print mode using discolorable toner or a print mode using non-discolorable toner. For example, a user operates the operation panel 9, and thus can select any print mode out of a first print mode using discolorable toner and a second print mode using non-discolorable toner. Specifically, the user can select the above-described print modes from a mode selection screen of the display unit 9*a* of the operation panel 9. When the operation panel 9 accepts selection of the above-described first print mode, the operation control unit 7 selects the image forming by the first print mode. When the operation panel 9 accepts selection of the above-described second print mode, the operation control unit 7 selects the image forming by the second print mode.

The operation control unit 7 controls execution of the image forming by the image forming station 321*a* at the position facing the housing unit to house the toner 51*a*, in response to selection of the first print mode using discolorable toner by a user. The image forming station 321*a* is controlled by the operation control unit 7, to form an image using the toner 51*a*. Or, the operation control unit 7 controls execution of the image forming by the first to fourth image forming stations 321*a*-321*d* at the positions facing the housing units to house the toners 51*a*-51*d*, respectively, in response to selection of the first print mode using discolorable toners by a user. The first to fourth image forming stations 321*a*-321*d* are controlled by the operation control unit 7, to form images using the toners 51*a*-51*d*, respectively.

The operation control unit 7 controls execution of the image forming by the image forming station 322*a* at the position facing the housing unit to house the toner 61*a*, in response to selection of the second print mode using non-discolorable toner by a user. The image forming station 322*a* is controlled by the operation control unit 7, to form an image using the toner 61*a*. Or, the operation control unit 7, controls execution of the image forming by the fifth to eighth image forming stations 322*a*-322*d* at the positions facing the housing units to house the toners 61*a*-61*d*, respectively, in response to selection of the second print mode using non-discolorable toners by a user. The fifth to eighth image forming stations 322*a*-322*d* are controlled by the operation control unit 7, to form images using the toners 61*a*-61*d*, respectively.

FIG. 3 is a diagram showing an example of a heating temperature of the fixing unit. For example, as shown in FIG. 3, the fixable temperature of the discolorable toner is about 150 degrees. The fixable temperature is a lower limit temperature of the fixing temperature at which a toner image is fixed to a sheet. The fixing temperature has a range from the lower limit temperature to an upper limit temperature lower than a specified temperature. The specified temperature is a predetermined temperature. The fixable temperature of the non-discolorable toner is about 170 degrees. The erasing temperature of the discolorable toner is about 190 degrees higher than the above-described specified temperature. In the present embodiments, the case will be described in which the fixable temperature of the discolorable toner and the fixable temperature of the non-discolorable toner are different, but the fixable temperature of the discolorable toner and the fixable temperature of the non-discolorable toner may be equal to each other.

When the first print mode to use the discolorable toner is selected by a user, or image forming by the first print mode to use the discolorable toner is performed, the heater control device 123 performs ON/OFF control of the heater 35*a*, to control the heating temperature of the fixing unit 35 to a fixing temperature within the range from a first temperature to a second temperature. In addition, when the second print mode to use the non-discolorable toner is selected by a user, or image forming by the second print mode to use the non-discolorable toner is performed, the heater control device 123 performs ON/OFF control of the heater 35*a*, to control the heating temperature of the fixing unit 35 to a fixing temperature within the range from a first temperature to a second temperature.

For example, the heater control device 123 controls the heating temperature of the fixing unit 35 to the fixing temperature of the range from the above-described 150 degrees to 180 degrees, for example. The heater control device 123 detects temperatures in the vicinity of the heater and in the vicinity of the fixing unit 35, and controls the heating temperature of the fixing unit 35 to the fixing temperature within the range from the above-described 150 degrees to 180 degrees, based on the temperature detection result. At the time of image erasing operation, the heater control device 123 detects temperatures in the vicinity of the heater 35*a* and in the vicinity of the fixing unit 35, and controls the heating temperature of the fixing unit 35 to the erasing temperature within the range from the above-described 190 degrees to 195 degrees, for example, based on the temperature detection result.

While the MFP 1 continuously forms images by the above-described print mode, the MFP 1 may be unable to keep the heating temperature of the fixing unit 35 to the fixing temperature sometimes. In some cases, while the MFP 1 performs image forming by the first print mode using the discolorable toner, the heating temperature of the fixing unit 35 may exceed 180 degrees that is the upper limit temperature of the fixing temperature, or exceed 185 degrees, or exceed 190 degrees. If the heating temperature of the fixing unit 35 does not reach the erasing temperature, but has exceeded the fixing temperature, the image formed using the discolorable toner may discolor and deteriorate, at the time of fixing the image by the fixing unit 35. In addition, if the heating temperature of the fixing unit 35 has reached the erasing temperature, or has exceeded the erasing temperature, the image formed with the discolorable toner is erased, at the time of fixing the image by the fixing unit 35.

Figure 4:
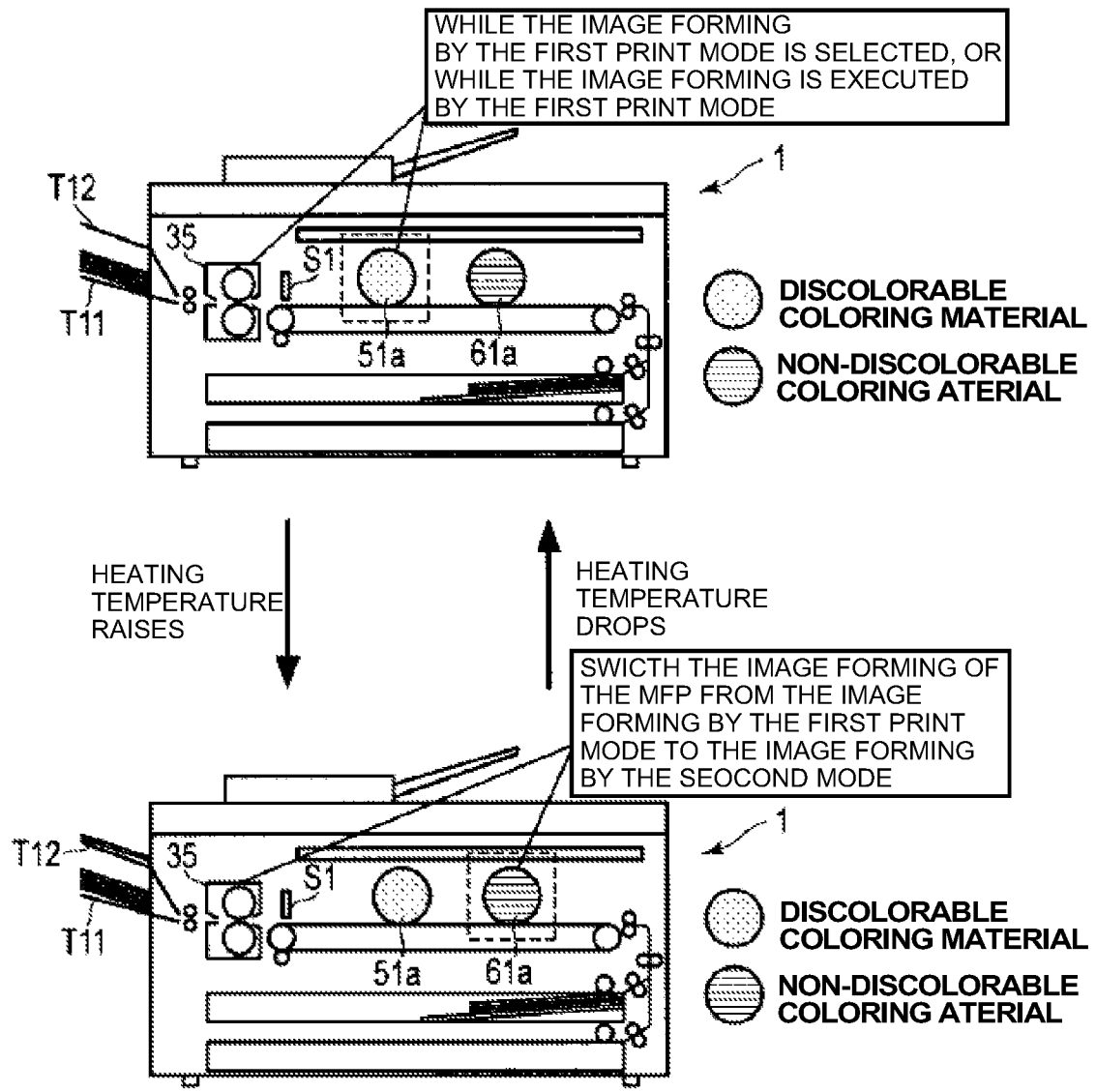
FIG. 4 is a view showing an example of switching of the image forming by a print mode of the image forming apparatus according to the first and second embodiments.

FIG. 4 is a view showing switching of the print mode. As shown in FIG. 4, While the image forming by the first print mode using the discolorable toner is selected, or while the image forming is executed by the first print mode, in case that the heating temperature of the fixing unit 35 has exceeded the fixing temperature, in case that the heating temperature of the fixing unit 35 has reached the erasing temperature of the discolorable toner, or in case that the heating temperature has exceeded the erasing temperature, the MPU 79 of the operation control unit 7 turns OFF the heater 35*a* that is the heat source of the fixing unit 35, to interrupt the image forming with the discolorable toner. The MPU 79 selects the image forming by the second print mode using the non-discolorable toner. In other words, the MPU 79 switches the image forming of the MFP 1 from the image forming by the first print mode to the image forming by the second print mode. The MFP 1 does not resume the image forming by the first print mode until the heating temperature of the fixing unit 35 falls within the range of the fixing temperature of the discolorable toner.

Figure 5A:
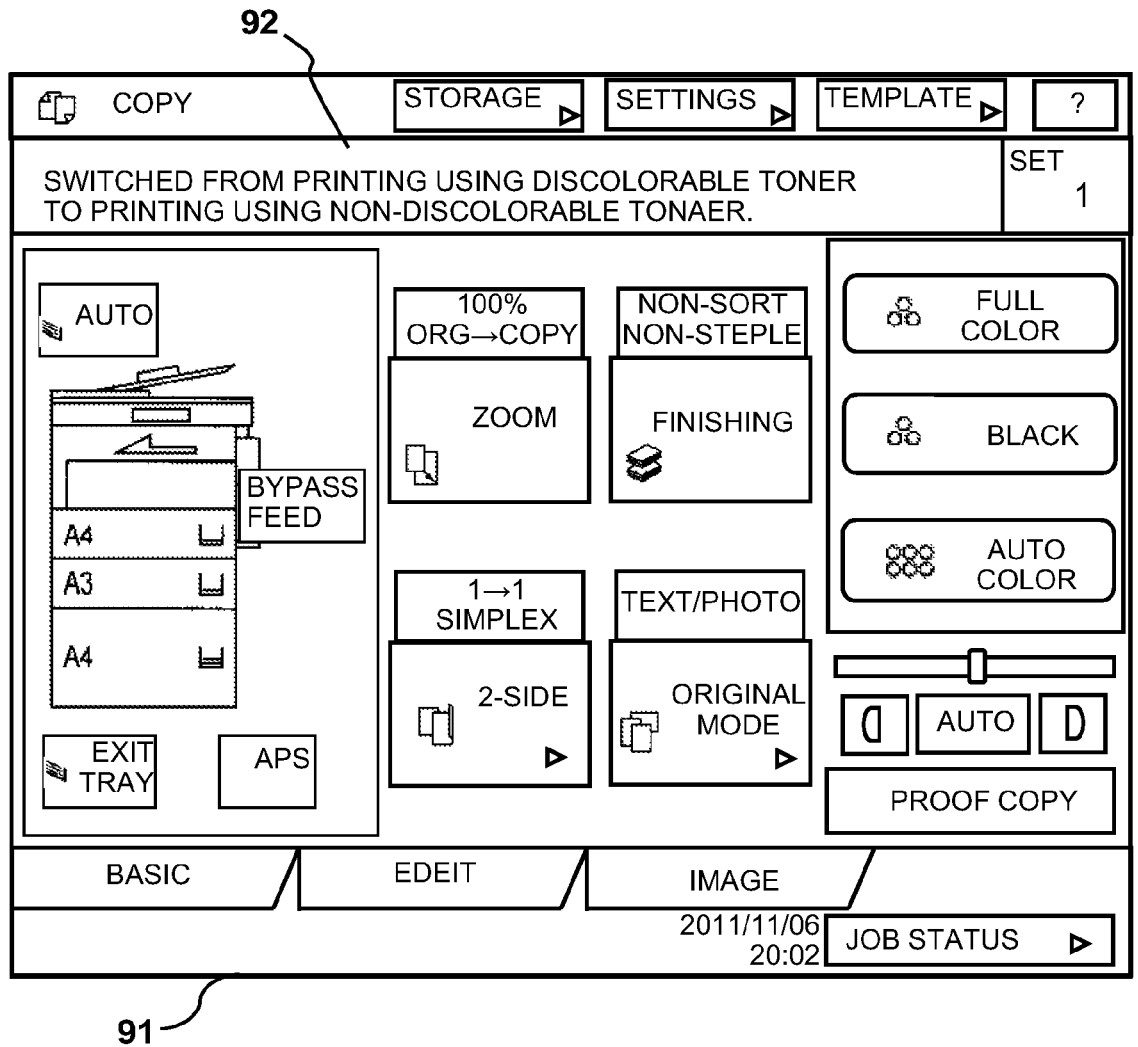
FIG. 5A is a view showing an example of a display screen which the display unit of the image forming apparatus according to the first and second embodiments displays for guiding switching from the image forming by a first print mode to the image forming by a second print mode.
Figure 5B:
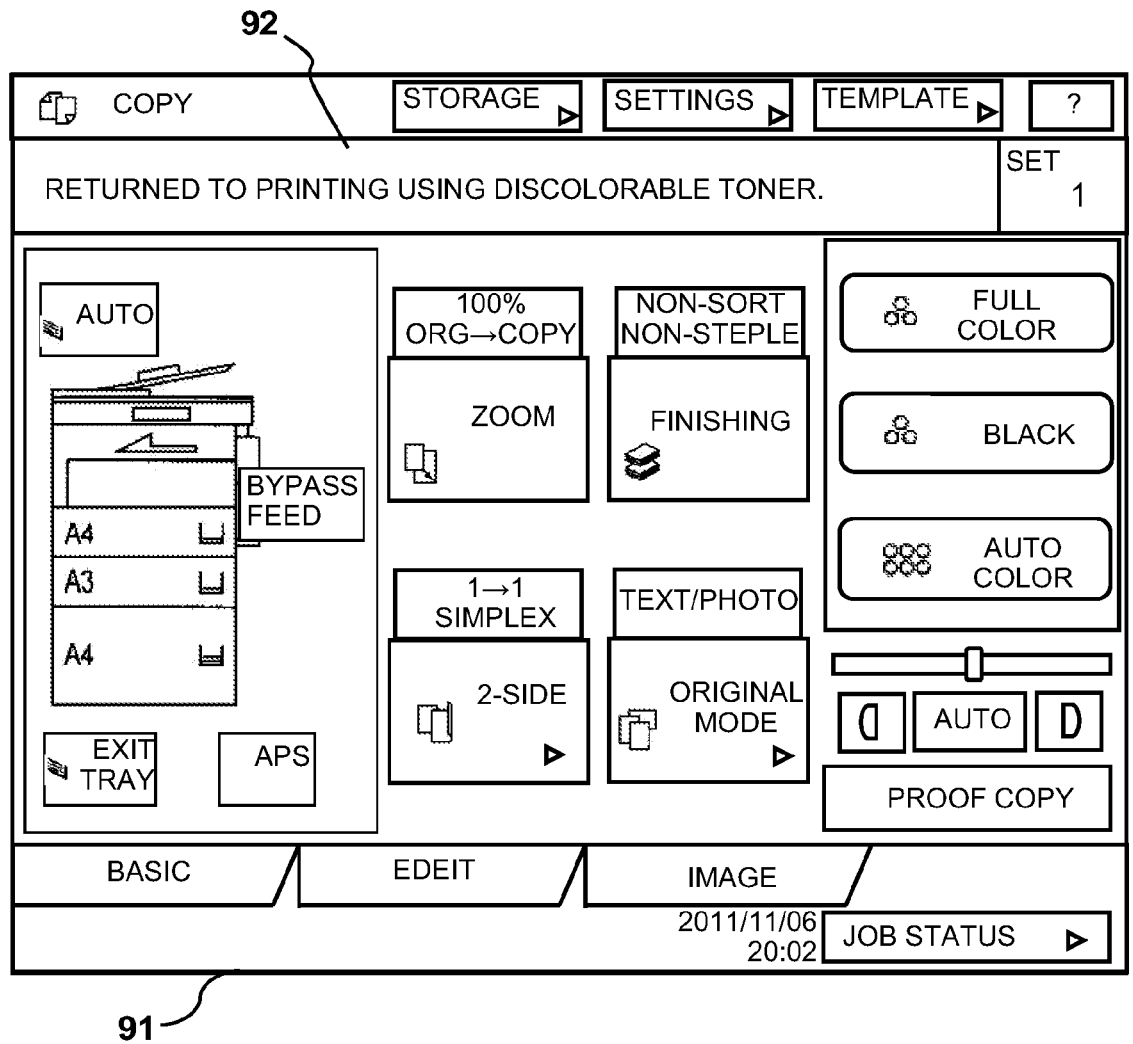
FIG. 5B is a view showing an example of a display screen which the display unit of the image forming apparatus according to the first and second embodiments displays for guiding switching from the image forming by the second print mode to the image forming by the first print mode.

The MPU 79 of the operation control unit 7 controls output of information relating to interruption of the image forming by the first print mode, and information relating to selection of the image forming by the second print mode. In other words, the MPU 79 controls output of information relating to interruption of the image forming using the discolorable toner, and information relating to switching from the image forming using the discolorable toner to the image forming with the non-discolorable toner. The display unit 9*a* displays the information relating to the interruption of the image forming by the first print mode, and the selection of the image forming by the second print mode, in accordance with the output of the above-described information. In other words, the display unit 9a displays the information relating to the interruption of the image forming using the discolorable toner, and the information relating to the switching from the image forming using the discolorable toner to the image forming using the non-discolorable toner. FIG. 5A and FIG. 5B are views each showing a display screen 91 which the display unit 9a displays. The display screen 91 has a guide display area 92. As shown in FIG. 5A, the display unit 9a displays a message of "switched from printing using discolorable toner to printing using non-discolorable toner", for example, in the guide display area 92. Furthermore, the image forming unit 3 may form information indicating the image forming with the non-discolorable toner, such as a mark, on a sheet, along with an image that is an object to be printed. A user visually observes the above-described mark of the image printed sheet, to recognize that the present image forming is the image forming with the non-discolorable toner.

When the heating temperature of the fixing unit 35 falls within the range of the fixing temperature, the MPU 79 of the operation control unit 7 controls the image forming by the image forming unit 3, so that the MFP 1 resumes the image forming by the first print mode using the discolorable toner. In other words, the MPU 79 switches the image forming of the MFP 1 from the image forming by the second print mode using the non-discolorable toner to the image forming by the first print mode using the discolorable toner.

The MPU 79 of the operation control unit 7 controls output of information relating to switching from the image forming by the second print mode to the image forming by the first print mode. In other words, the MPU 79 controls output of information relating to the switching from the image forming using the non-discolorable toner to the image forming with the discolorable toner. The display unit 9a displays a message of "returned to printing using discolorable toner", for example, in the guide display area 92, as shown in FIG. 5B. Furthermore, the image forming unit 3 may form information indicating the image forming with the discolorable toner, such as a mark, on a sheet, along with an image that is an object to be printed. A user visually observes the above-described mark of the image printed sheet, to recognize that the present image forming is the image forming with the discolorable toner.

A user operates the display unit 9a of the operation panel 9, and thereby can designate validity or invalidity of the execution of automatic switching to the above-described second print mode. When the operation panel accepts the designation by the user that the execution of the above-described automatic switching is valid, the MPU 79 of the operation control unit 7 sets the execution of the above-described automatic switching to be valid. When the operation panel accepts the designation by the user that the execution of the above-described automatic switching is invalid, the MPU 79 sets the execution of the above-described automatic switching to be invalid. In accordance with the setting that the execution of the above-described automatic switching is valid, when the heating temperature of the fixing unit 35 has exceeded the fixing temperature, when the heating temperature of the fixing unit 35 has reached the erasing temperature of the discolorable toner, or when the heating temperature of the fixing unit 35 has exceeded the erasing temperature, the MPU 79 interrupts the image forming by the first print mode, and automatically switches the image forming of the MFP 1 from the image forming by the first print mode to the image forming by the second print mode.

In accordance with the setting that the execution of the above-described automatic switching is invalid, when the heating temperature of the fixing unit 35 has exceeded the fixing temperature, when the heating temperature of the fixing unit 35 has reached the erasing temperature of the discolorable toner, or when the heating temperature of the fixing unit 35 has exceeded the erasing temperature, the MPU 79 interrupts the image forming by the first print mode. When the execution of the above-described automatic switching is set to be invalid, the MPU 79 does not execute automatic switching from the image forming by the first print mode to the image forming by the second print mode.

As described above, even in case that the heating temperature of the fixing unit 35 has become a high temperature, the image forming by the second print mode using the non-discolorable toner is executed, and thereby the MFP 1 can effectively use the time till the heating temperature of the fixing unit 35 falls within the fixing temperature.

Figure 6:
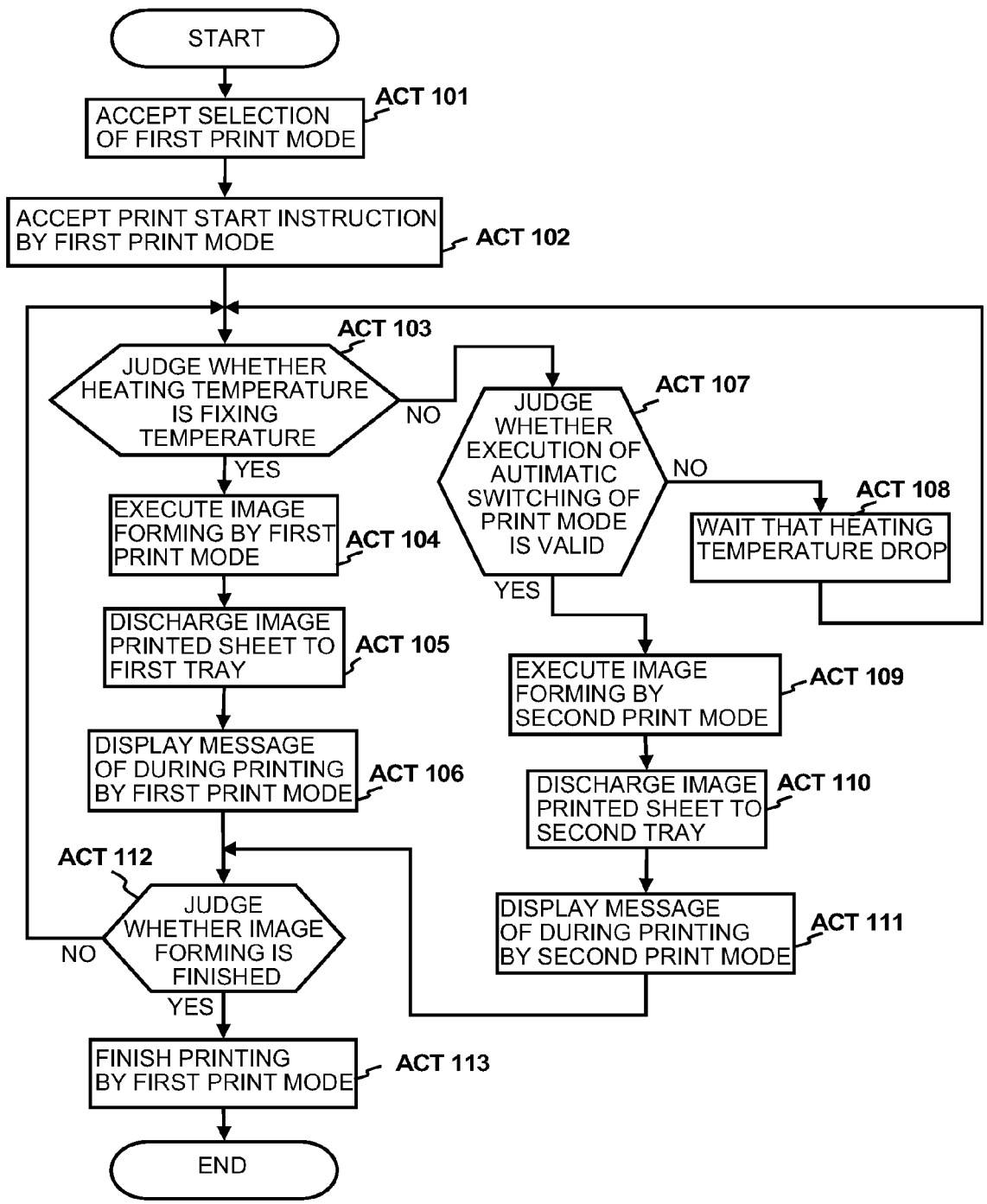
FIG. 6 is a flowchart showing an example of execution control of switching of the image forming by the print mode of the image forming apparatus according to the first and second embodiments.

An example of execution control of the switching of the image forming by the above-described print mode will be described with reference to FIG. 6. FIG. 6 is a flowchart showing an example of execution control of the switching of the image forming by the above-described print mode.

For example, when the MFP 1 is started, the heater control device 123 starts heating by the heater 35a that is the heating source of the fixing unit 35. After the heating is started, the heater control device 123 performs ON/OFF control of the heating by the heater 35a. The heating temperature of the fixing unit 35 is maintained to the standby temperature that is a ready temperature, by the control of the heater control device 123.

For example, when a user operates the display unit 9a of the operation panel 9, to instruct print start in the print mode using the discolorable toner or the non-discolorable toner, the heater control device 123 performs ON/OFF control of the heating by the heater 35a of the fixing unit 35 maintained to the standby temperature. The heating temperature of the fixing unit 35 is maintained to the fixing temperature by the control of the heater control device 123. When the heating temperature of the fixing unit 35 reaches the fixable temperature, the MFP 1 becomes able to print. The image forming unit 3 starts printing.

Specifically, in an ACT 101 of FIG. 6, the display unit 9a of the operation panel 9 accepts selection by a user of the first print mode using the discolorable toner. Furthermore, in an ACT 102, the operation panel 9 accepts an instruction of print start by the user.

In an ACT 103, the operation control unit 7 judges whether or not the heating temperature of the fixing unit 35 is the fixing temperature, based on the temperature detection result of the sensor. In other words, the operation control unit 7 judges whether or not the heating temperature of the fixing unit 35 is maintained within the range of the fixing temperature lower than the erasing temperature. When the operation control unit 7 judges that the heating temperature of the fixing unit 35 is maintained to the fixing temperature (YES in ACT 103), the operation of the MFP 1 proceeds to an ACT 104.

In the ACT 104, the operation control unit 7 controls the image forming by the image forming unit 3 so that the MFP 1 executes the image forming by the first print mode. The image forming unit 3 executes the image forming by the first print mode using the discolorable toner. In an ACT 105, the MPU 79 of the operation control unit 7 controls the conveying units so as to discharge the image printed sheet to the first sheet discharge tray T11. The conveying units discharge the image printed sheet to the first sheet discharge tray T11. In an ACT 106, the display unit 9a is controlled by the operation control unit 7, to display a message such as "during printing with discolorable toner".

In an ACT 112, the operation control unit 7 judges whether or not the image forming for the sheets of a number previously set by a user is finished, each time the image forming for a sheet is finished, for example. When the operation control unit 7 judges that the image forming for the sheets of the set number is not finished (NO in ACT 112), the operation of the MFP 1 returns to the ACT 103.

The MFP 1 repeats the above-described processings from the ACT 103 to the ACT 112, until the image forming for the sheets of the set number is finished. When the operation control unit 7 judges that the image forming for the sheets of the set number has been finished (YES in ACT 112), the operation of the MFP 1 proceeds to an ACT 113. In the ACT 113, the operation control unit 7 finishes control for image forming by the image forming unit 3. Accordingly, the MFP 1 finishes printing in the first print mode using the discolorable toner.

On the other hand, when the display unit 9a accepts selection by a user of the first print mode using the discolorable toner (the above-described ACT 101), the operation panel 9 accepts an instruction of print start by the user (the above-described ACT 102), and the operation control unit 7 judges that the heating temperature of the fixing unit 35 exceeds the upper limit of the fixing temperature (NO in the above-described ACT 103), the operation of the MFP 1 proceeds to an ACT 107. That the heating temperature of the fixing unit exceeds the upper limit of the fixing temperature may be the case in which the heating temperature approaches the erasing temperature, for example, or the case in which the heating temperature exceeds the erasing temperature.

In the ACT 107, the MPU 79 of the operation control unit 7 controls the heater control device 123. The heater control device 123 turns OFF heating by the heater 35a. The MPU 79 controls execution interruption of the image forming by the image forming unit 3. The image forming unit 3 is controlled by the MPU 79, to interrupt the image forming by the first print mode using the discolorable toner. The operation control unit 7 judges whether the execution of the automatic switching of the image forming by the print mode is set to be valid or set to be invalid. When the operation control unit 7 judges that the execution of the above-described automatic switching is set to be invalid (NO in ACT 107), the operation of the MFP 1 proceeds to an ACT 108.

In the ACT 108, the operation control unit 7 controls execution interruption of the image forming by the image forming unit 3, till the heating temperature of the fixing unit 35 drops and falls within the range of the fixing temperature. In other words, the operation control unit 7 controls so that the image forming by the image forming unit 3 is not resumed, till the heating temperature of the fixing unit 35 drops and falls within the range of the fixing temperature. The operation of the MFP 1 returns to the ACT 103 after a prescribed time elapses, for example. In the above-described ACT 107, when the operation control unit 7 judges that the execution of the above-described automatic switching is set to be valid (YES in ACT 107), the operation of the MFP 1 proceeds to an ACT 109.

In the ACT 109, the MPU 79 of the operation control unit 7 switches the image forming of the MFP 1, from the image forming by the first print mode to the image forming by the second print mode. The MPU 79 controls the image forming by the image forming unit 3 so that the MFP 1 executes the image forming by the second print mode. The image forming unit 3 executes the image forming by the second print mode using the non-discolorable toner. In an ACT 110, the MPU 79 of the operation control unit 7 controls the conveying units so as to discharge the image printed sheet to the second sheet discharge tray T12. The conveying units discharge the image printed sheet to the second sheet discharge tray T12.

In an ACT 111, the display unit 9a is controlled by the operation control unit 7, to display a message such as "during printing with non-discolorable toner". When the MFP 1 finishes the image forming by the second print mode to one sheet, the operation of the MFP 1 returns to the above-described ACT 112.

In the above-described description, the case has been described in which, when the heating temperature of the fixing unit 35 exceeds the upper limit temperature of the fixing temperature, approaches the erasing temperature, or exceeds the erasing temperature, the image forming by the first print mode using the discolorable toner is interrupted, and the image forming by the second print mode using the non-discolorable toner is executed, but the present embodiment is not limited to this. For example, the MFP 1 further has a high speed print mode using the discolorable toner, and a high image quality print mode using the discolorable toner. When a user selects the Above-described high speed print mode, even if the heating temperature of the fixing unit 35 exceeds the upper limit temperature of the fixable temperature, but if it does not approach the erasing temperature, that is, if it is not more than 185 degrees, for example, the operation control unit 7 controls the image forming by the image forming unit 3, so that the MFP 1 executes the image forming by the high speed print mode.

The image forming unit 3 executes the image forming by the high speed print mode using the discolorable toner. When a user selects the above-described high image quality print mode, in case that the heating temperature of the fixing unit 35 exceeds the upper limit temperature of the fixing temperature, the operation control unit 7 controls execution interruption of the image forming by the image forming unit 3. The image forming unit 3 interrupts the execution of the image forming by the high image quality print mode using the discolorable toner.

The fixing unit 35 fixes an image in the state in which the heating temperature of the fixing unit 35 exceeds the upper limit temperature of the fixing temperature, and approaches the erasing temperature, and thus the MFP 1 can also realize light color printing. For example, the fixing unit 35 heats the image of the discolorable toner at about 185 degrees, the MFP 1 can also realize printing of a light color image.

According to the MFP 1 of the present embodiment, it is possible to improve defects due to temperature rise of the fixing unit 35. For example, when the heating temperature of the fixing unit 35 exceeds the upper limit temperature of the fixing temperature, or approaches the erasing temperature, or exceeds the erasing temperature, the MFP 1 interrupts the image forming using the discolorable toner. The image forming is interrupted, and thus it can be prevented that an image with deteriorated image quality, or an image which has been erased has been formed, in the first print mode using the discolorable toner.

When the heating temperature of the fixing unit 35 exceeds the upper limit temperature of the fixing temperature, or approaches the erasing temperature, or exceeds the erasing temperature, the MFP 1 interrupts the image forming with the discolorable toner, and further executes the image forming using the non-discolorable toner, in place of the image forming using the discolorable toner.

When the heating temperature of the fixing unit 35 exceeds the erasing temperature, the MFP 1 may execute the erasing operation. For example, when a sheet on which an image has been formed with the discolorable toner is held in the above-described manual feed tray 146, and the heating temperature of the fixing unit 35 exceeds the erasing temperature, the MFP 1 executes the erasing operation. Specifically, the MFP 1 feeds and conveys the sheet which is held in the above-described manual feed tray 146 to the fixing unit 35, and heats the image printed on the sheet by the fixing unit 35, to erase the image.

The above-described coloring material, such as toner or ink, contains a coloring compound, a color developer and a binder resin and so on, as described above. When the coloring material in the state in which the coloring compound has generated a color upon receiving the action of the color developer is heated at a prescribed temperature, the binder resin softens, and mainly the color developer becomes easy to move from the inside of the binder resin to the surface, and moves and/or diffuses into the sheet. Accordingly, the coloring compound becomes not to receive the action of the color developer, and thus the color of the coloring compound becomes not recognizable by a user.

The above-described coloring compound is a precursor compound of the coloring matter to form an image. As the coloring compound, it is preferable to use electron donating organic matter, such as, leuko-auramines, diarylphthalides, polyarylcarbinols, acylauramines, arylauramines, rhodamine B lactams, indolines, spiropyrans, fluorans, and so on.

The above-described color developer is a compound to make the coloring compound generate a color by the mutual action (mainly giving and receiving electrons or protons) with the coloring compound. As the color developer, it is preferable to use phenols, phenol metal salts, carboxylic acid metal salts, benzophenones, sulfuric acid, sulfonates, phosphoric acids, phosphoric acid metal salts, acidic phosphate ester, acidic phosphate ester metal salts, phosphorous acids, phosphorous acid metal salts, and so on.

The above-described binder resin is to disperse the coloring compound and the color developer in the color developing state. The binder resin may be one representing characteristics that the one becomes compatible with the coloring compound when prescribed heat is given, and does not have affinity with the color developer While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
an image forming unit configured to execute any image forming out of image forming to form an image on a recording medium by a first mode using a discolorable coloring material which discolors by heating, and image forming to form an image on a recording medium by a second mode using a non-discolorable coloring material;
a fixing unit configured to heat the image formed on the recording medium at a fixing temperature lower than a heating temperature at which the discolorable coloring material discolors, to fix the image on the recording medium;
a temperature control unit configured to control a heating temperature of the fixing unit to the fixing temperature; and
an operation control unit configured to select the image forming by the second mode, when the heating temperature of the fixing unit becomes a temperature higher than the fixing temperature.

2. The image forming apparatus according to claim 1, wherein:
while the image forming by the first mode is selected, when the heating temperature of the fixing unit becomes the temperature higher than the fixing temperature, the operation control unit selects the image forming by the second mode.

3. The image forming apparatus according to claim 2, wherein: while the image forming unit executes the image forming by the first mode, when the heating temperature of the fixing unit becomes the temperature higher than the fixing temperature, the operation control unit switches the image forming by the first mode to the image forming by the second mode.

4. The image forming apparatus according to claim 1, wherein: the fixing temperature is a temperature lower than a specified temperature, the heating temperature at which the discolorable coloring material discolors is a temperature higher than the specified temperature, and when the heating temperature of the fixing unit becomes the temperature higher than the specified temperature, the operation control unit selects the image forming by the second mode.

5. The image forming apparatus according to claim 1, wherein: the operation control unit further outputs information relating to selection of the image forming by the second mode.

6. The image forming apparatus according to claim 3, wherein: the operation control unit outputs information relating to switching from the image forming by the first mode to the image forming by the second mode.

7. The image forming apparatus according to claim 3, wherein: after the operation control unit switches the image forming from the image forming by the first mode to the image forming by the second mode, when the heating temperature of the fixing unit becomes the fixing temperature, the operation control unit switches the image forming from the image forming by the second mode to the image forming by the first mode.

8. The image forming apparatus according to claim 3, further comprising an operation panel to accept selection of any one mode out of the first mode and the second mode, wherein:
when the operation panel accepts the first mode, the image forming unit selects the image forming by the first mode, and when the operation panel accepts the second mode, the image forming unit selects the image forming by the second mode, and while the operation control unit selects the image forming by the first mode, when the heating temperature of the fixing unit becomes the temperature higher than the fixing temperature, the operation control unit selects the image forming by the second mode.

9. The image forming apparatus according to claim 8, wherein:
the operation panel accepts designation to validate or invalidate execution of switching from the image forming by the first mode to the image forming by the second mode, and the operation control unit controls the execution of the switching to the image forming by the second mode, in accordance with the acceptance of the designation by the operation panel.

\* \* \* \* \*